US010883545B2

(12) United States Patent
Sugiyama et al.

(10) Patent No.: US 10,883,545 B2
(45) Date of Patent: Jan. 5, 2021

(54) POWER TRANSMISSION SHAFT

(71) Applicant: HITACHI AUTOMOTIVE SYSTEMS, LTD., Hitachinaka (JP)

(72) Inventors: Kenichi Sugiyama, Commerce Township, MI (US); Xiaojin Zhu, Atsugi (JP); Yasutomo Mabe, Atsugi (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 688 days.

(21) Appl. No.: 15/630,295

(22) Filed: Jun. 22, 2017

(65) Prior Publication Data
US 2018/0003240 A1    Jan. 4, 2018

(30) Foreign Application Priority Data

Jun. 30, 2016 (JP) .................................. 2016-129514

(51) Int. Cl.
*F16B 21/18* (2006.01)
*F16D 1/08* (2006.01)
(Continued)

(52) U.S. Cl.
CPC .......... *F16D 1/0894* (2013.01); *B25B 27/205* (2013.01); *F16B 21/186* (2013.01);
(Continued)

(58) Field of Classification Search
CPC ................... F16D 1/0894; F16D 1/116; F16D 2003/22323; F16D 2001/103;
(Continued)

(56) References Cited

U.S. PATENT DOCUMENTS 1,114,123 A * 10/1914 Dalton .................. F16D 1/0894
  403/355
3,367,692 A *  2/1968 Balian ..................... F16D 1/116
  403/355
(Continued)

FOREIGN PATENT DOCUMENTS

GB       2064697        6/1981
JP     S56-086216 A     7/1981
(Continued)

OTHER PUBLICATIONS

Office Action received in corresponding Japanese Patent Application No. 2016-129514 dated Nov. 12, 2019.

*Primary Examiner* — Matthew R McMahon
(74) *Attorney, Agent, or Firm* — Foley & Lardner LLP

(57) ABSTRACT

A power transmission shaft is interposed between a first shaft section and a second shaft section. The power transmission shaft comprises: a cylindrical section rotated integrally with a shaft section and formed cylindrically; a through hole disposed in the cylindrical section and penetrated radially with respect to a rotational axial line, each of a pair of vehicle side rotational shaft sections having an engagement groove disposed on an outer peripheral side of the pair of vehicle side rotational shaft sections and extended in a direction around the rotational axial line and the engagement groove being exposed from the through hole; and a retaining ring (circlip) disposed to enclose at least a portion of the outer peripheral side of the cylindrical section, a portion of the retaining ring being inserted into the through hole from the outer peripheral side of the cylindrical section and being engaged with the engagement groove.

20 Claims, 19 Drawing Sheets

(51) Int. Cl.
　　　*B25B 27/20*　　　(2006.01)
　　　*F16D 1/116*　　　(2006.01)
　　　*F16D 3/223*　　　(2011.01)
　　　*F16D 1/10*　　　(2006.01)
(52) U.S. Cl.
　　　CPC .............. *F16D 1/116* (2013.01); *F16D 3/223* (2013.01); *F16D 2001/103* (2013.01); *F16D 2003/22323* (2013.01); *F16D 2003/22326* (2013.01)
(58) Field of Classification Search
　　　CPC ........... F16D 2003/22326; F16D 3/223; F16B 21/186; B25B 27/205
　　　See application file for complete search history.

(56) References Cited

U.S. PATENT DOCUMENTS

| | | | | |
|---|---|---|---|---|
| 3,450,424 | A * | 6/1969 | Calisher | F16L 37/144 285/305 |
| 4,635,974 | A * | 1/1987 | Moussaian | F16B 21/186 285/305 |
| 5,518,332 | A * | 5/1996 | Katoh | F16B 21/16 285/305 |
| 7,048,972 | B2 | 5/2006 | Kitahata et al. | |
| 7,104,893 | B2 * | 9/2006 | Ouchi | B21J 5/12 464/178 |
| 7,195,399 | B2 * | 3/2007 | Myers | B60B 27/00 301/105.1 |
| 7,595,095 | B2 | 9/2009 | Kitahata et al. | |
| 7,722,089 | B2 * | 5/2010 | Nauer | F16L 37/0885 285/321 |
| 7,946,374 | B2 * | 5/2011 | Kofuji | F16D 1/10 180/219 |
| 8,477,386 | B2 * | 7/2013 | Cheng | H04N 1/00554 271/117 |
| 8,864,591 | B2 * | 10/2014 | Sugiyama | F16C 1/04 464/173 |
| 9,528,389 | B2 * | 12/2016 | Koerner | F01D 25/16 |
| 9,587,669 | B2 * | 3/2017 | Koontz | F16C 11/045 |
| 9,926,967 | B2 * | 3/2018 | Kawai | F16B 21/186 |
| 10,151,352 | B2 * | 12/2018 | Creek | F16D 1/116 |
| 2012/0308293 | A1 | 12/2012 | Yamakawa | |
| 2016/0017929 | A1 | 1/2016 | Sugiyama et al. | |

FOREIGN PATENT DOCUMENTS

| | | | |
|---|---|---|---|
| JP | S60-014351 U | 1/1985 | |
| JP | H03-100632 A | 10/1991 | |
| JP | H03-100632 U | 10/1991 | |
| JP | H04-119617 U | 10/1992 | |
| JP | 2005-066598 A | 3/2005 | |
| JP | 2012-250616 A | 12/2012 | |
| JP | 2013-194895 A | 9/2013 | |
| WO | WO-2006080132 A1 * | 8/2006 | ............. F16D 1/116 |
| WO | WO-2014/136626 A1 | 9/2014 | |

\* cited by examiner

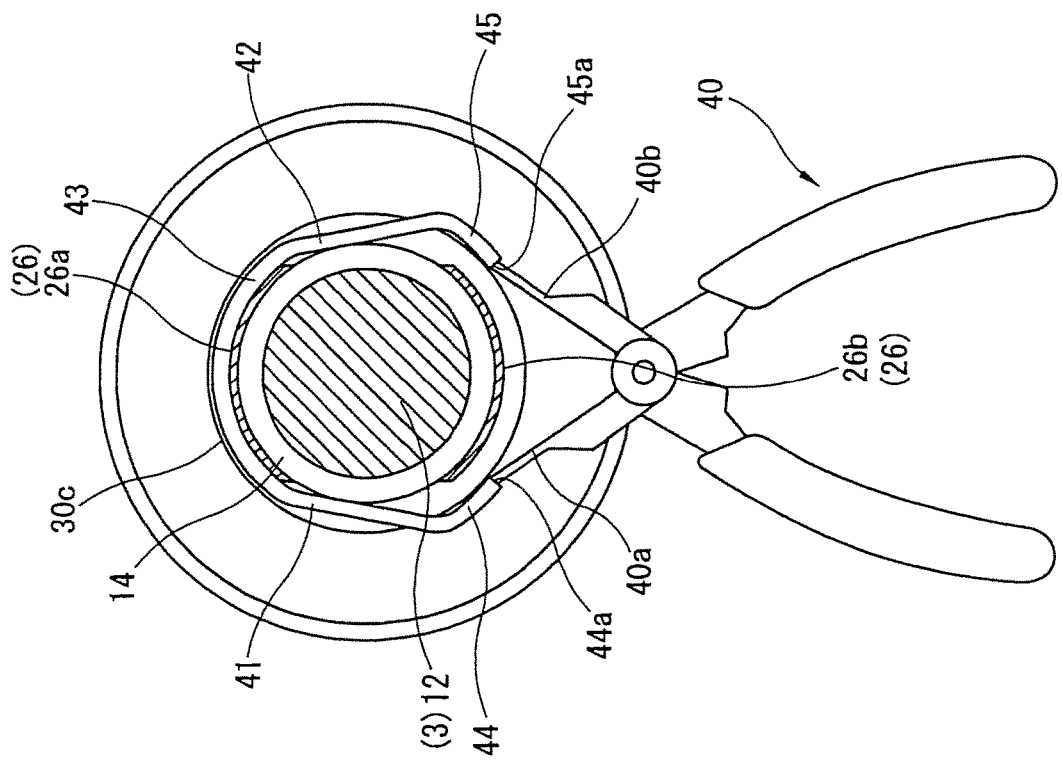
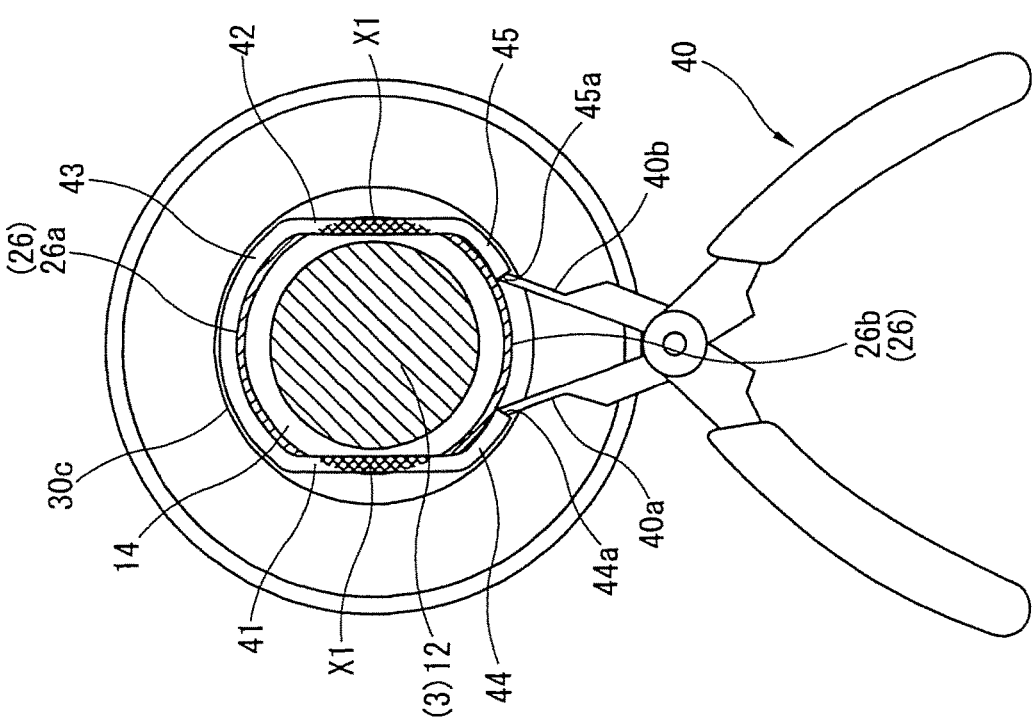

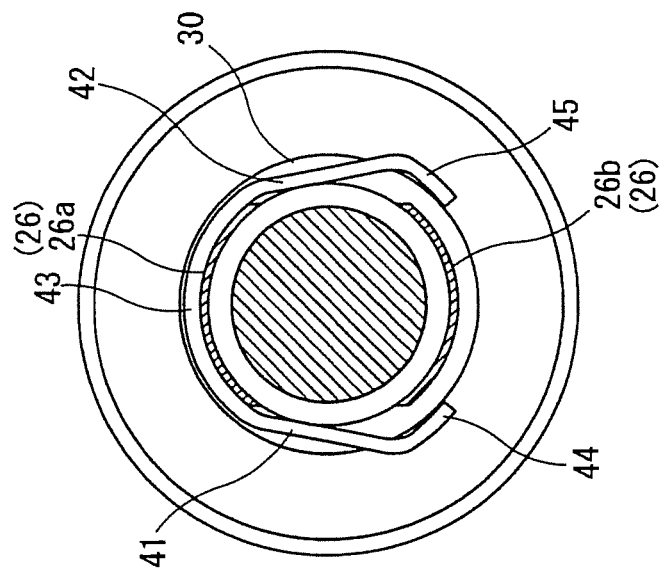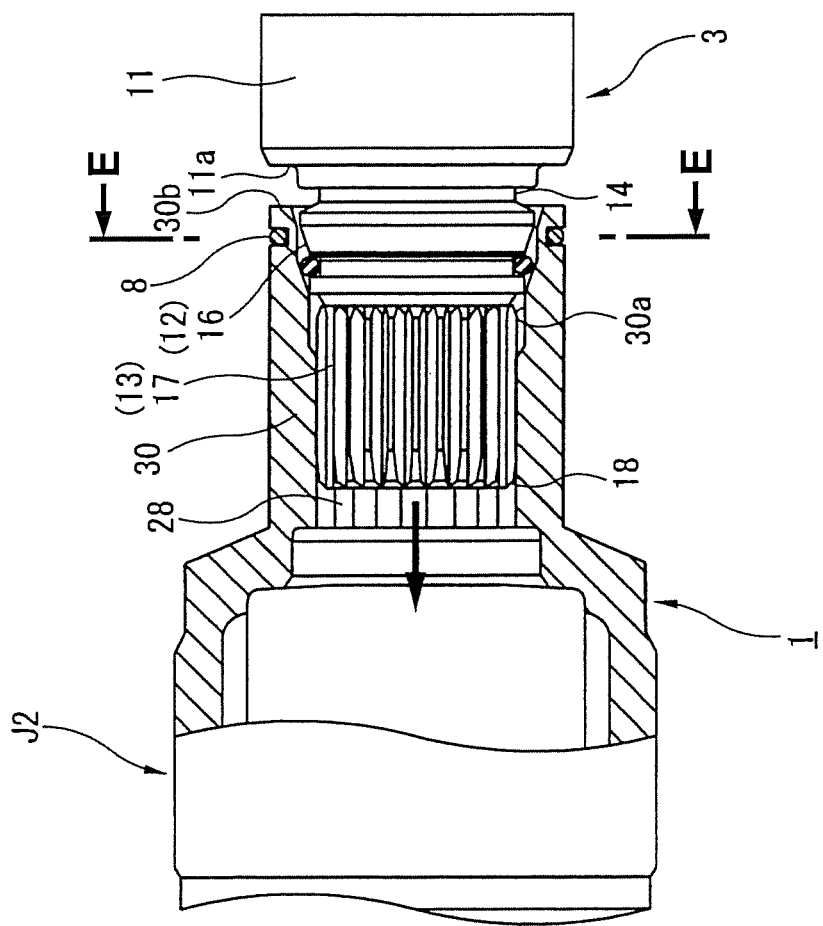

POWER TRANSMISSION SHAFT

BACKGROUND OF THE INVENTION

(1) Field of the Invention

The present invention relates to a power transmission shaft such as a propeller shaft applicable to, for example, an automotive vehicle for transmitting a driving force of a driving source to driving wheels of the vehicle.

(2) Description of Related Art

For example, a Japanese Patent Application Laid Open Publication No. 2013-194895 published on Sep. 30, 2013 discloses a previously proposed propeller shaft.

That is, the previously proposed propeller shaft has an axial direction one end side via a constant velocity (universal) joint linked to a first shaft at a driving source side and axial direction other end side linked to a driving wheel side via another constant velocity (universal) joint. Then, at this time, the first shaft and the second shaft are linked to the respective constant velocity (universal) joints by an engagement stop of a circlip (retaining ring) fitted onto an outer peripheral side of the first and second shafts into an annular engagement (stop) groove cut out formed on an inner peripheral side of the first and the second shafts.

SUMMARY OF THE INVENTION

However, since, in the previously proposed propeller shaft, the circlip (retaining ring) is engageably stopped into the engagement stop groove located at the inner peripheral side of each constant velocity (universal) joint (an inner wheel member), a visual recognition of the engagement stop state of the circlip (retaining ring) cannot externally be recognized. Thus, there is a possibility that an appropriate attachment of the propeller shaft (the power transmission shaft) cannot be carried out. It is an object of the present invention to provide a power transmission shaft (propeller shaft) which can recognize the engagement stop state of the circlip (retaining ring) from an external.

According to one aspect of the present invention, there is provided a power transmission shaft interposed between a first shaft section and a second shaft section, the first shaft section and the second shaft section being a pair of vehicle side rotational shaft sections, the first shaft section being disposed on a driving source side of the vehicle and the second shaft section being disposed on a driving wheel side, the power transmission shaft transmitting a rotation of the driving source to the driving wheel and comprising: a shaft section disposed between the first shaft section and the second shaft section; a cylindrical section rotated integrally with the shaft section and formed cylindrically, each of the pair of vehicle side rotational shaft sections being inserted into an inside of the cylindrical section; a through hole disposed in the cylindrical section and penetrated radially with respect to a rotational axial line of the pair of vehicle side rotational shaft sections, each of the pair of vehicle side rotational shaft sections having an engagement groove disposed on an outer peripheral side of the pair of vehicle side rotational shaft sections and extended in a direction around the rotational axial line of the pair of vehicle side rotational shaft sections and the engagement groove being exposed from the through hole in a state in which each of the pair of vehicle side rotational shaft sections is inserted into the cylindrical section; and a circlip disposed to enclose at least a portion of the outer peripheral side of the cylindrical section, a portion of the circlip being inserted into the through hole from the outer peripheral side of the cylindrical section and being engaged with the engagement groove.

According to the present invention, a drop out of the vehicle side rotational shafts is prevented in a form of a fitting of the circlip (retaining ring) onto the cylindrical section so that an engagement stop state of the vehicle side rotational shafts with the circlip (retaining ring) can be recognized from an external. Consequently, an appropriate prevention of the drop-out of the circlip can be secured.

In addition, according to the present invention, the circlip (retaining ring) can also engageably be stopped into the engagement stop groove by an insertion of the vehicle side rotational shafts in the state in which the circlip (retaining ring) is previously fitted into the cylindrical section. The engagement stop operation according to the circlip (retaining ring) can become easier and an improvement of a linkage workability (operability) between the propeller shaft (power transmission shaft) and the vehicle side rotational shafts can be achieved.

BRIEF DESCRIPTION OF THE DRAWINGS

FIGS. 10(a) and 10(b) are views representing forms of an engagement stop state and an engagement stop release state by means of a circlip (also, called a retaining ring), respectively. (It should be noted that FIG. 10(b) corresponds to the view corresponding to FIG. 8).

FIGS. 12(a) and 12(b) are a side view and a cross sectional view cut away along a line E-E in FIG. 12(a), each representing a midway state when the propeller shaft is linked to the output shaft.

DETAILED DESCRIPTION OF THE INVENTION

Hereinafter, a detailed description of a power transmission shaft (viz., a propeller shaft) has been made in order to facilitate better understanding of preferred embodiments according to the present invention on a basis of accompanied drawings. It should be noted that, in the preferred embodiments of the power transmission shaft (viz., propeller shaft), the present invention is applicable to the power transmission shaft (propeller shaft) for an automotive vehicle and this application will be exemplified, in the same way as described before for the previously proposed propeller shaft.

First Embodiment

Figure 1:
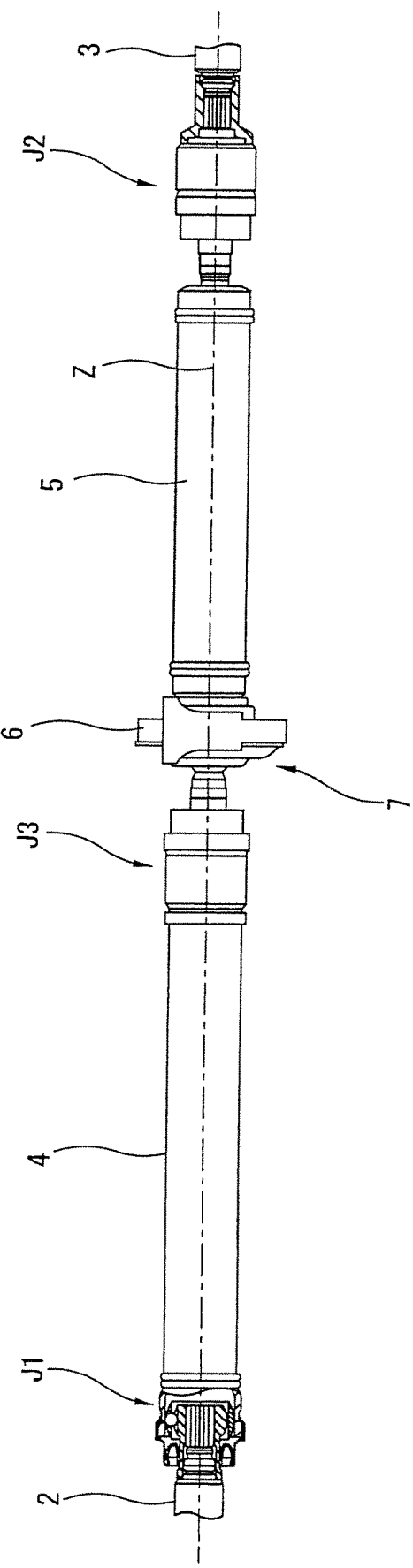
FIG. 1 is a side view of a propeller shaft (a power transmission shaft) according to the present invention.

FIGS. 1 through 13(b) show a first preferred embodiment of the power transmission shaft (also called the propeller shaft) according to the present invention. FIG. 1 shows a side view of the power transmission shaft (propeller shaft) representing a whole of the propeller shaft (power transmission shaft).

It should be noted that, in the following description, for convenient purposes, a left side of FIG. 1 is explained as a front, a right side of FIG. 1 is explained as a rear, a direction along a rotation center axial line in FIG. 1 is explained as an axial (shaft) line, and a direction around a rotational center axial (shaft) line is explained as a peripheral direction.

(Structure of power transmission shaft) Power transmission shaft 1 includes: a driving shaft 4 integrally rotatably linked to an input shaft 2 interlinked to a transmission (not shown) via a first constant velocity (universal) joint J1; and a driven shaft 5 integrally rotatably linked to an output shaft 3 interlinked to a differential (not shown) via a second constant velocity (universal) joint J2. Both of shafts 4, 5 are integrally rotatably linked to each other via a third constant velocity (universal) joint. In addition, both of shafts 4, 5 are rotatably supported via a center bearing 7 suspended on a vehicle body (not shown). A bracket 6 is also included. It should be noted that driving shaft 4 and driven shaft 5 constitute a shaft section according to the present invention.

Figure 2:
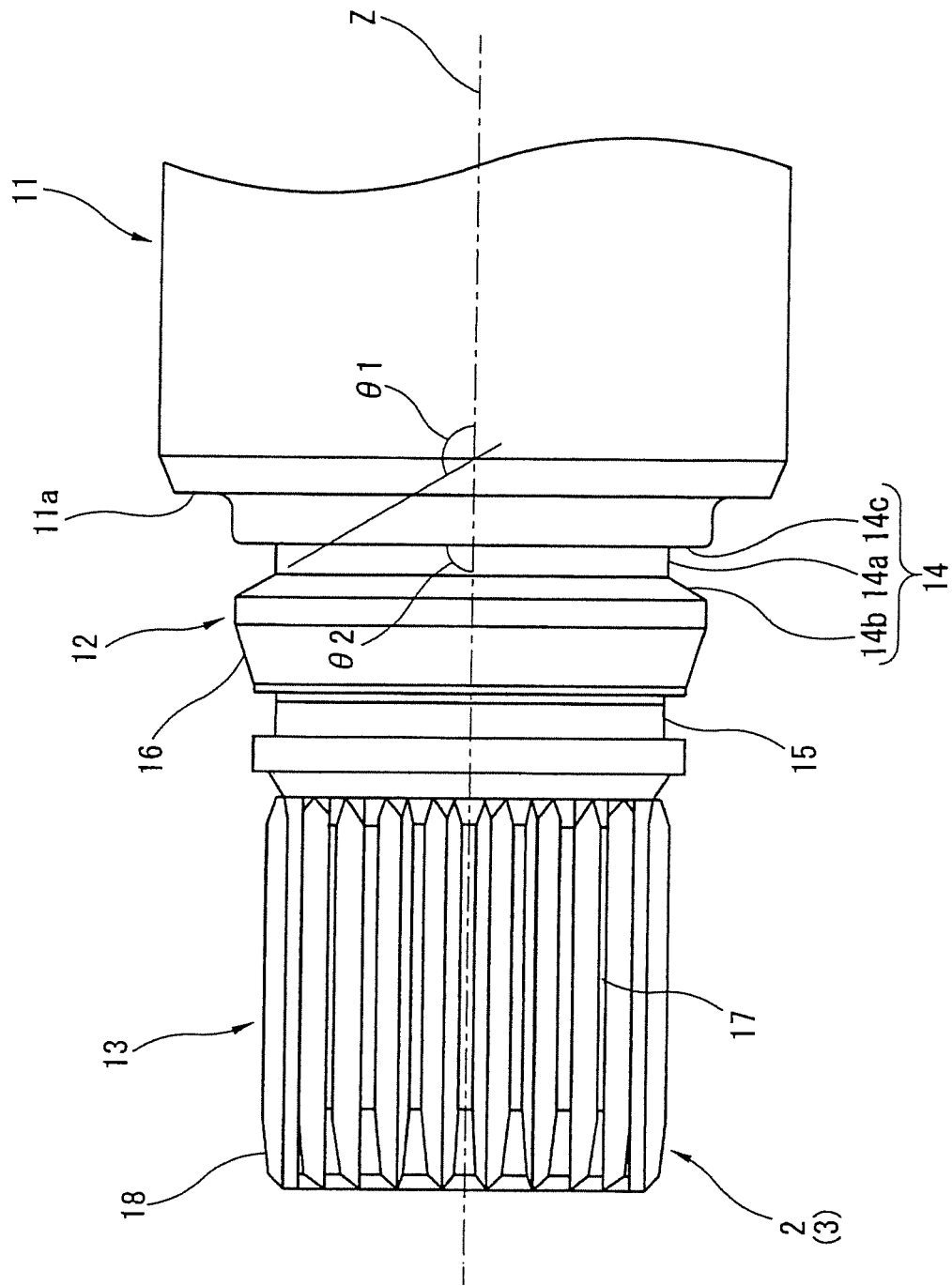
FIG. 2 is an essential part expanded view of an input shaft (or an output shaft) shown in FIG. 1.

FIG. 2 shows an essential part expanded view of the input shaft or the output shaft expanding and displaying a linkage end section of the input shaft or the output shaft to the propeller shaft (power transmission shaft).

Each of input shaft 2 and output shaft 3 is mainly constituted by a large diameter section 11 interlinked to the transmission or the differential, a middle diameter section 12 in a step difference diameter shape integrally disposed on an end section of large diameter section 11; and a small diameter section 13 integrally disposed on an end section of middle diameter section 12.

Middle diameter section 12 includes an annular engagement stop groove (or an engagement groove) 14 into which a circlip (also called a retaining ring) 8 (refer to FIG. 4) which serves as a retainer (or stopper) for input shaft 2 and output shaft 3 during linkages between input shaft 2 and output shaft 3 and first and second constant velocity (universal) joints 31, 32 is engagement stopped and which is cut out formed along the peripheral direction, at large diameter 11 side thereof.

On the other hand, at the small diameter 13 side thereof, a seal groove 15 into which a seal ring (not shown) which serves to suppress an invasion of moisture (water) or so forth into an inside of each of first and second constant velocity (universal) joints 31, 32 is cut out formed along the peripheral direction.

Engagement stop mechanism 14 includes a pair of rising surfaces including a bottom surface 14a and small diameter side and large diameter side rising surfaces 14b, 14c standing up at axial (directional) both end sides of bottom surface 14a.

Small diameter side rising surface 14b of both rising surfaces 14b, 14c which is opposite side to a pull-out direction (first and second constant velocity (universal) joint sides 31, 32) is constituted as an upward tilting inclination wall directing toward first and second constant velocity (universal) joints set in such a way that an angle θ1 of engagement stop groove 14 side from among angles formed between the corresponding small diameter rising surface 14b and a rotation center axial line Z is larger than 90 degrees but smaller than 180 degrees.

Large diameter side rising surface 14c in the pull out direction (anti first and second constant velocity (universal) joint J1, J2 sides) is constituted as a vertically standing (upright) wall which is set in such a way that an angle θ2 formed between large diameter side rising surface 14c and rotational center axial (shaft) line Z is substantially at a right angle.

A downward tilting tapered section 16 directing toward seal groove 15 side namely, directing toward insertion directions of input shaft 2 and output shaft 3 is formed at anti first and second constant velocity (universal) joint sides 31, 32 of seal groove 15.

A male spline 17 is formed along the axial direction on a whole of an outer peripheral surface of small diameter section 13. In addition, another tapered section 18 is formed on a tip section of this small diameter section 13 and tapered section 18 serves to guide an insertion of small diameter section 13 into cylindrical section 30 as will be described later so that a smooth insertion thereof into cylindrical section 30 can easily be carried out.

Figure 3:
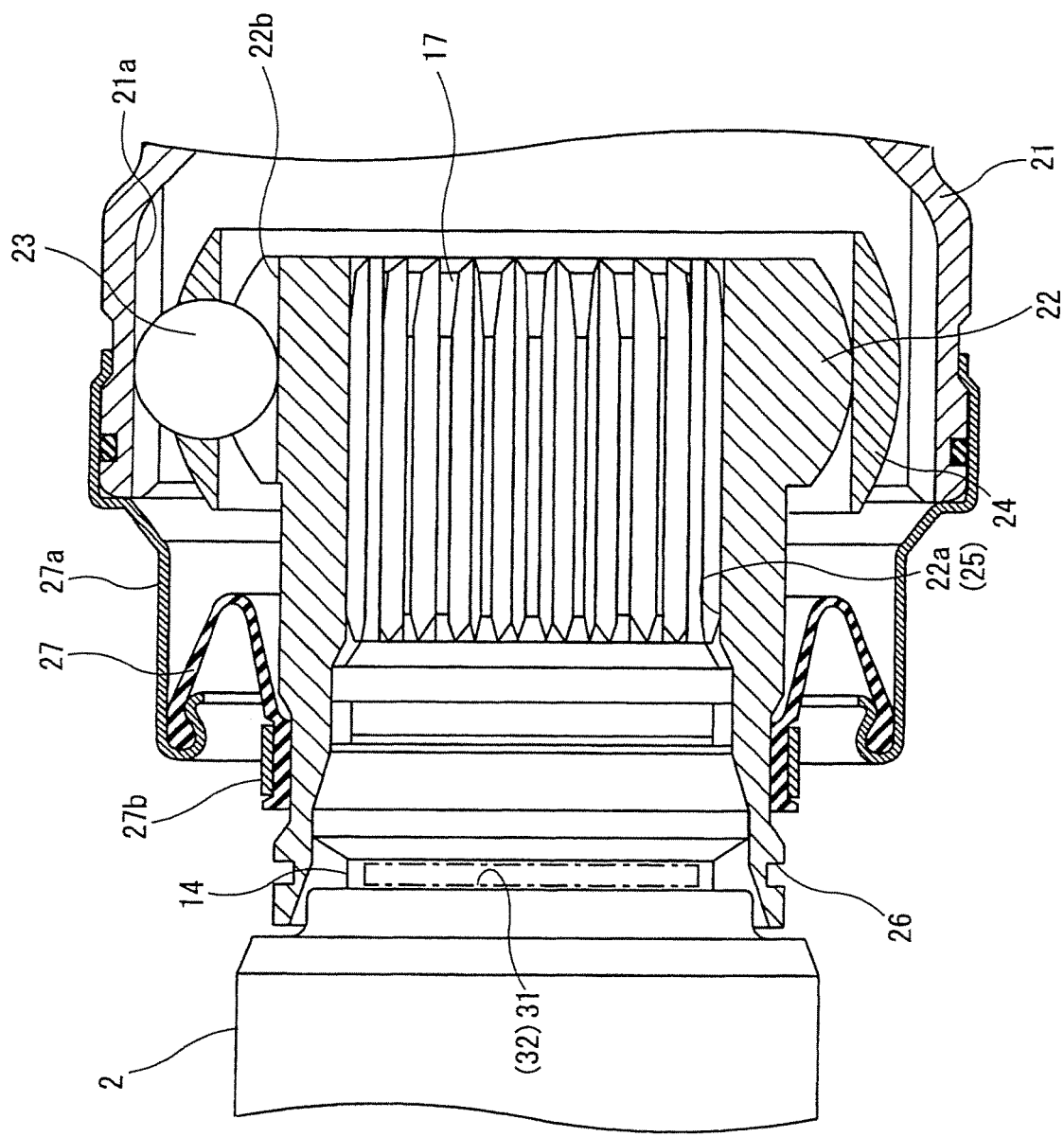
FIG. 3 is a longitudinally cross sectional view in a state in which the input shaft is inserted into an inner wheel member of a first constant velocity (universal) joint shown in FIG. 1.

FIG. 3 shows a longitudinally cross sectional view in a state in which input shaft 2 is inserted into first constant velocity (universal) joint J1.

First constant velocity (universal) joint J1 is mainly constituted by: an outer wheel member 21 whose one end in the axial direction is connected to driving wheel 4; an inner wheel member 22 arranged on an inner peripheral side of outer wheel member 21 and which receives a driving torque from input shaft 2; and a plurality of rolling bodies, viz., balls 23 rollably interposed between inner wheel member 22 and outer wheel member 21 and retained by a retainer 24 (or a retaining unit).

Outer wheel member 21 indicates a substantially cup shape which opens the other end side of outer wheel member 21 in the axial direction. Outer wheel member 21 includes a ball engagement groove 21a, at the inner peripheral side, as an axial direction groove which limits a relative movement of both outer wheel and inner wheel members 21, 22 in the peripheral direction by the engagement of each ball 23 to groove 21a, while allowing the relative movement of both wheel members 21, 22 in the axial direction by a rolling of each ball 23 thereon, ball engagement groove 21a being formed linearly along the axial direction, at an inner peripheral side.

Inner wheel member 22 exhibits a substantially cylindrical shape. An insertion hole 22a is penetrated in an inside axial direction of inner wheel member 22. A female spline 25 to which male spline 17 of input shaft 2 is engaged from the axial direction is cutout formed along the axial direction, at the inner peripheral side of insertion hole 22a. In addition, at the outer peripheral side at which each ball 23 is rolled, a ball engagement groove 22b is linearly cutout formed along the axial direction which is the axial directional groove in the same way as ball engagement groove 21a of outer wheel member 21.

Furthermore, an annular retaining groove 26 which serves to retain circlip (retaining ring) 8 is cutout formed along the peripheral direction, in a proximity of a front end edge of inner wheel member 22. At a portion of retaining groove 26 in the peripheral direction, a first through hole 31 and a second through hole 32 which are a pair of through holes opposed against engagement stop groove 14 of input shaft 2 in the radial direction in a state in which input shaft 2 is inserted into insertion hole 32a of inner wheel member 22 to expose engagement stop groove 14 externally are disposed against each other in the radial direction.

It should be noted that, since retaining groove 26 and first and second through holes 31, 32 are the same as those disposed on a cylindrical section 30 of second constant velocity (universal) joint J2 as will be described later, for convenience purposes, the specific structures of these groove and through holes will be described later together with the structure of cylindrical section 30.

A water-proof boot 27 which serves to protect first constant velocity (universal) joint J1 from water or dust is interposed between outer wheel member 21 and inner wheel member 22 to extend on both wheel members 21, 22. This water-proof boot 27 has a middle section in a bent form so as to be formed elastically in the axial direction. One end side in the axial direction of this boot 27 is fixed by caulking via a mounting bracket (attachment metal fittings) 27a onto an outer peripheral surface at a tip side of outer wheel member 21 and the other end of this boot 27 in the axial direction is fixed to the outer peripheral surface of inner wheel member 22 in a tight binding manner via a well known boot band 27b.

Figure 4:
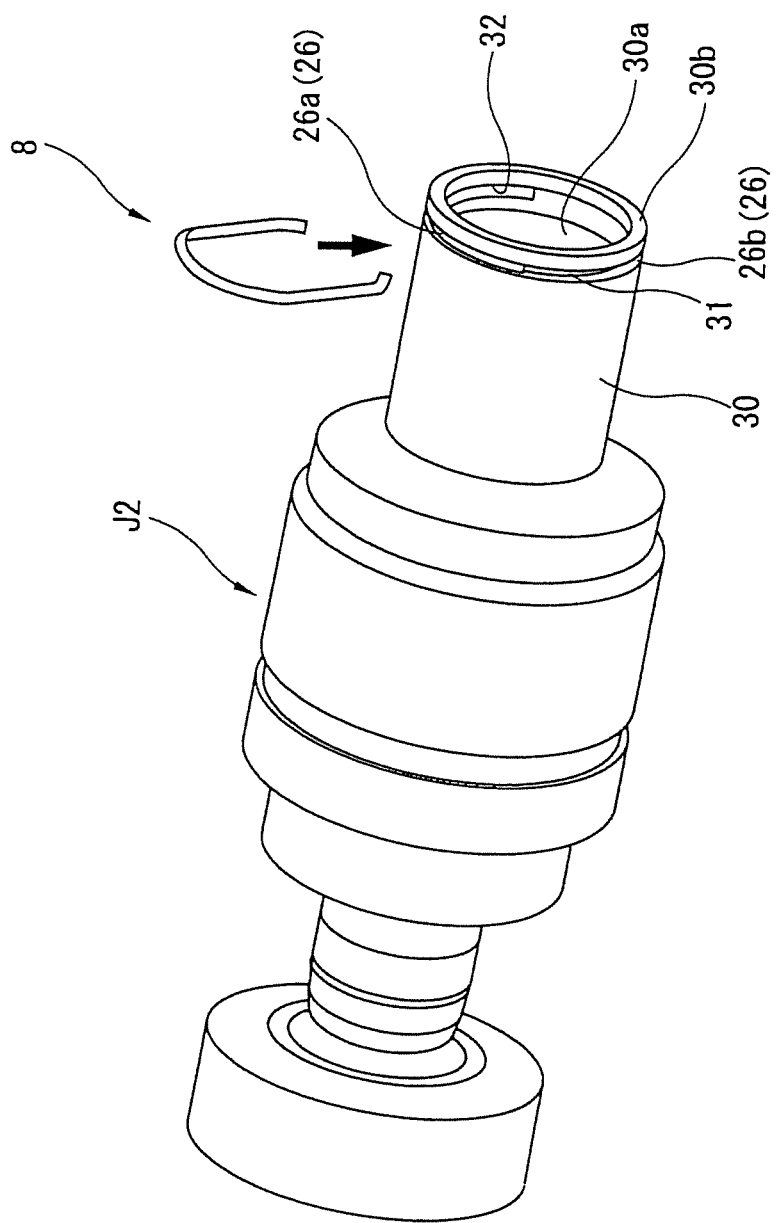
FIG. 4 is a perspective view in a proximity of a cylindrical section of a second constant velocity (universal) joint shown in FIG. 1.
Figure 5:
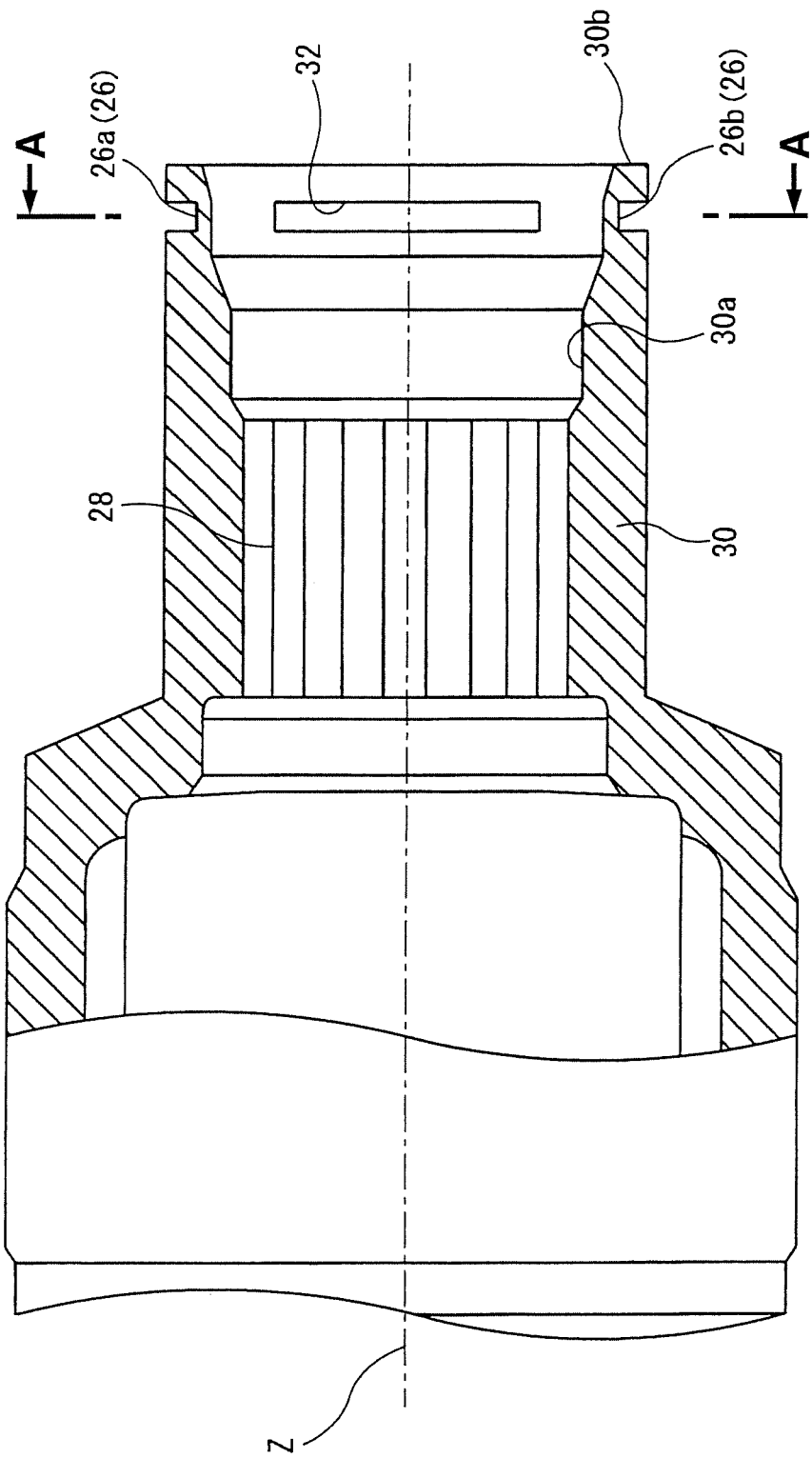
FIG. 5 is a cross sectional view in a proximity of cylindrical section of the second constant velocity (universal) joint.
Figure 6:
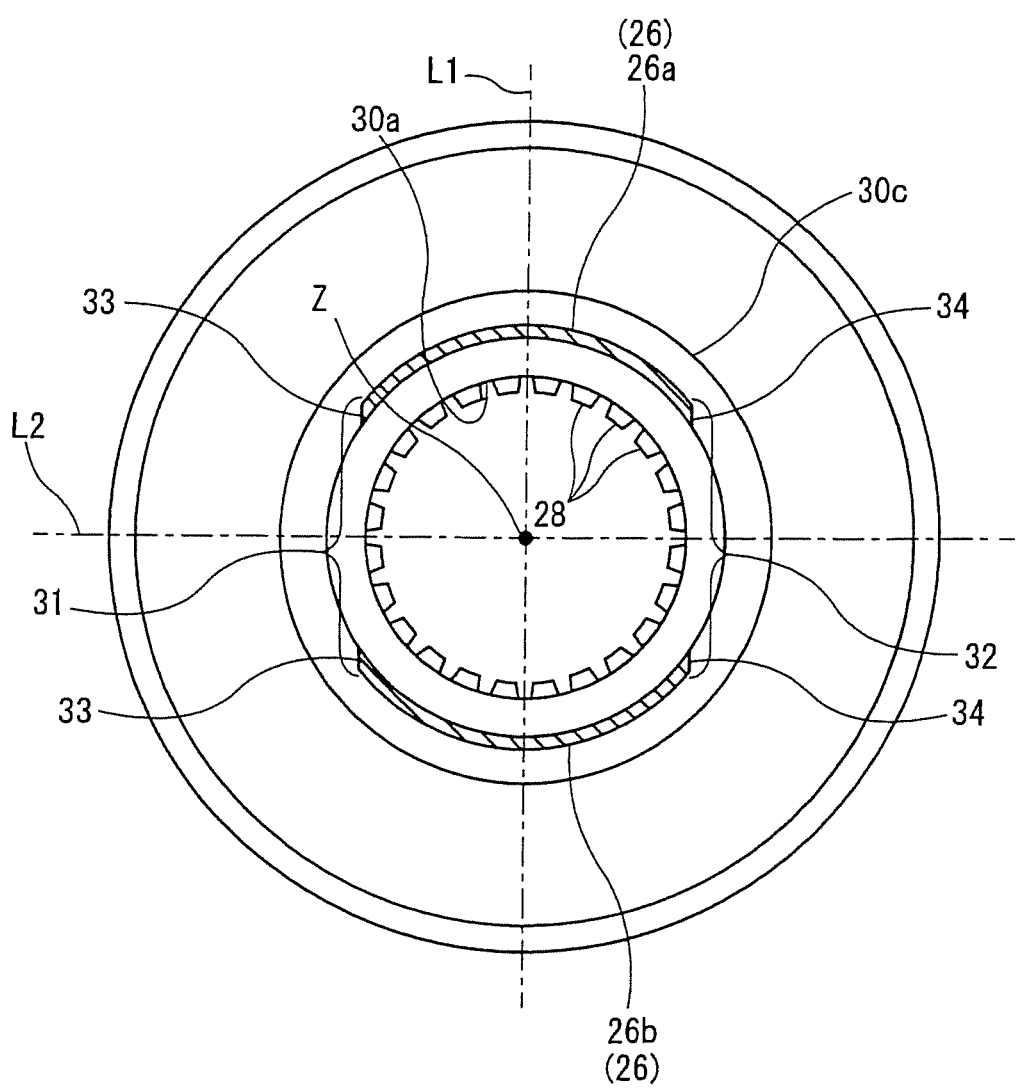
FIG. 6 is a cross sectional view cut away along a line A-A in FIG. 5.
Figure 7:
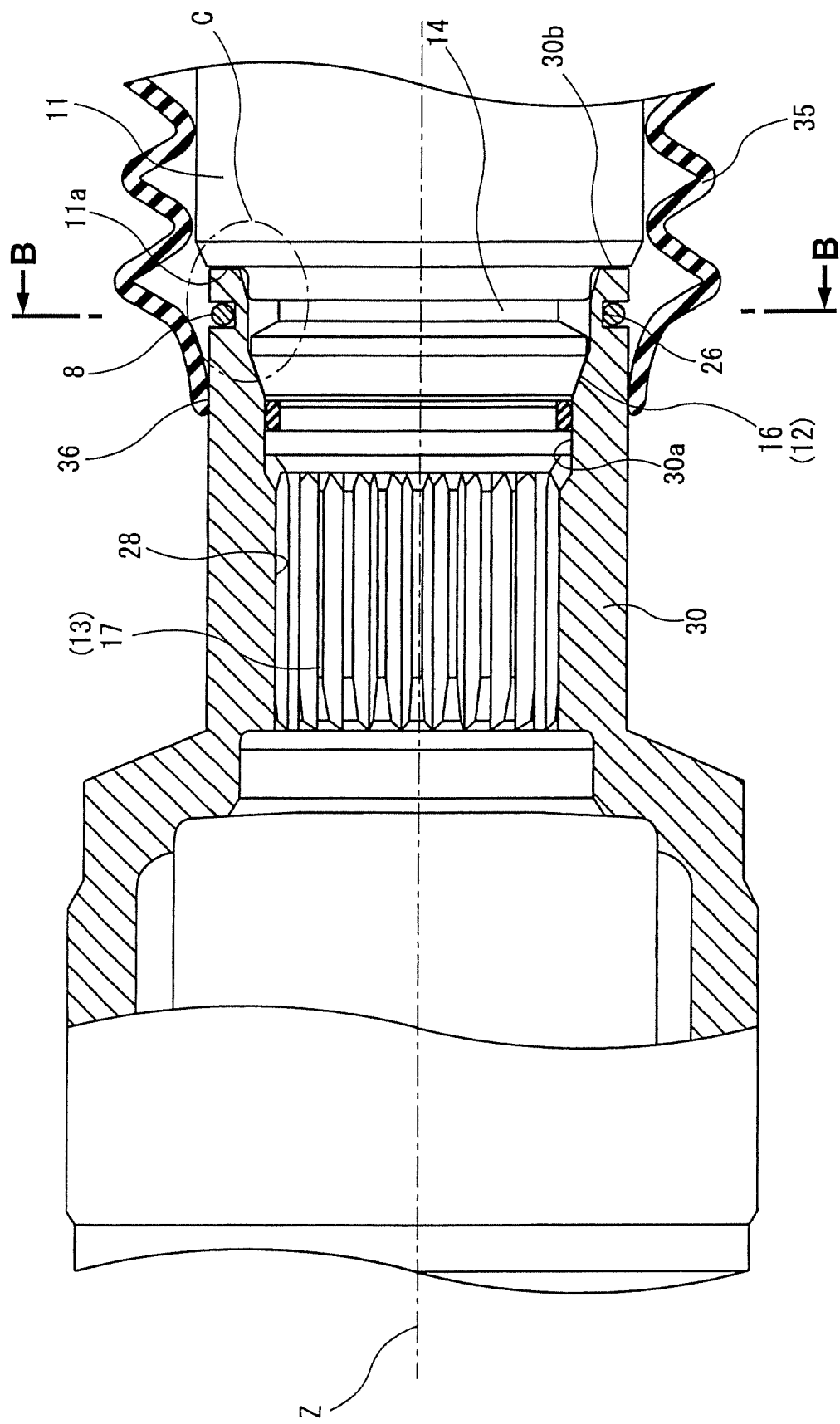
FIG. 7 is a longitudinally cross sectional view in a state in which the output shaft is inserted into a cylindrical section of the second constant velocity (universal) joint shown in FIG. 1.
Figure 8:
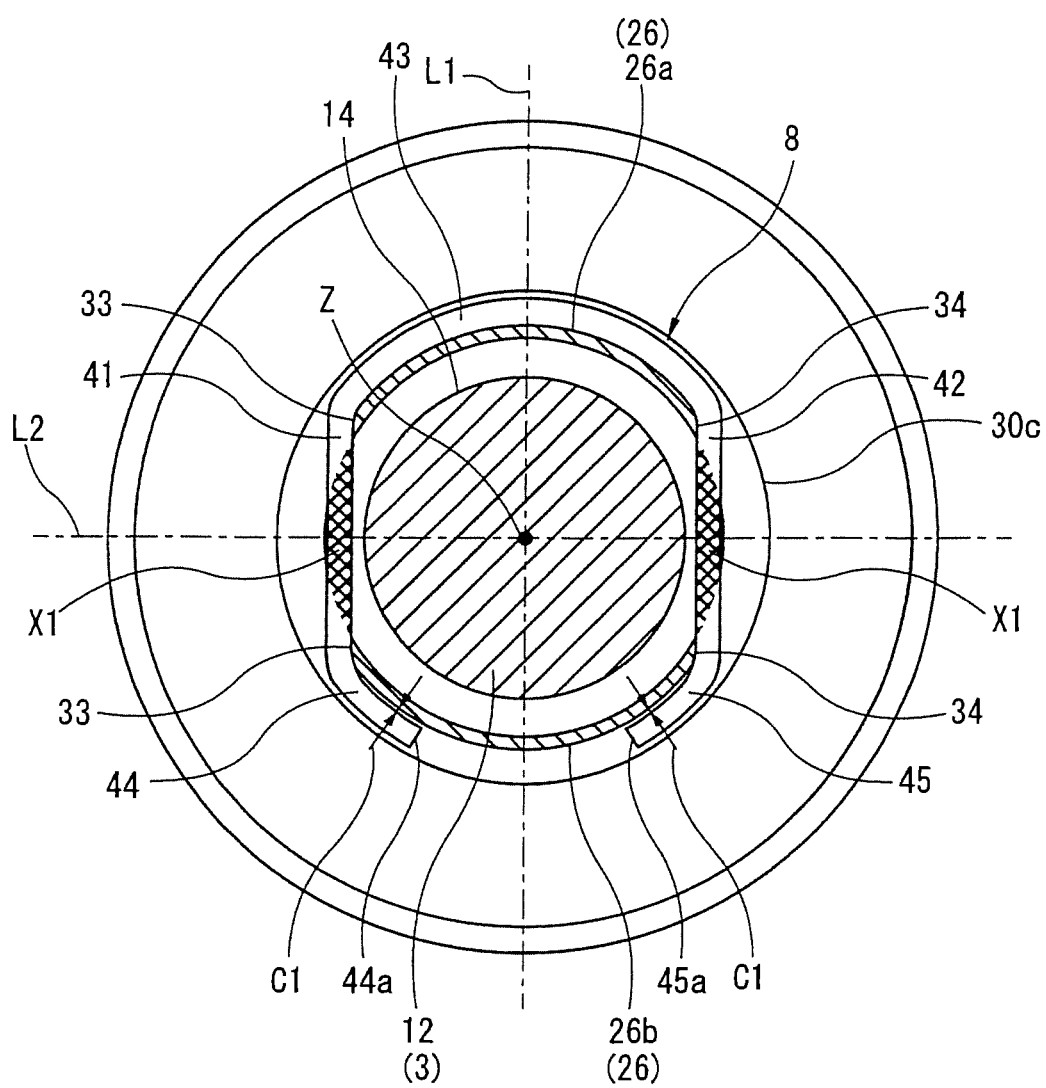
FIG. 8 is a cross sectional view cut away along a line B-B in FIG. 7.
Figure 9:
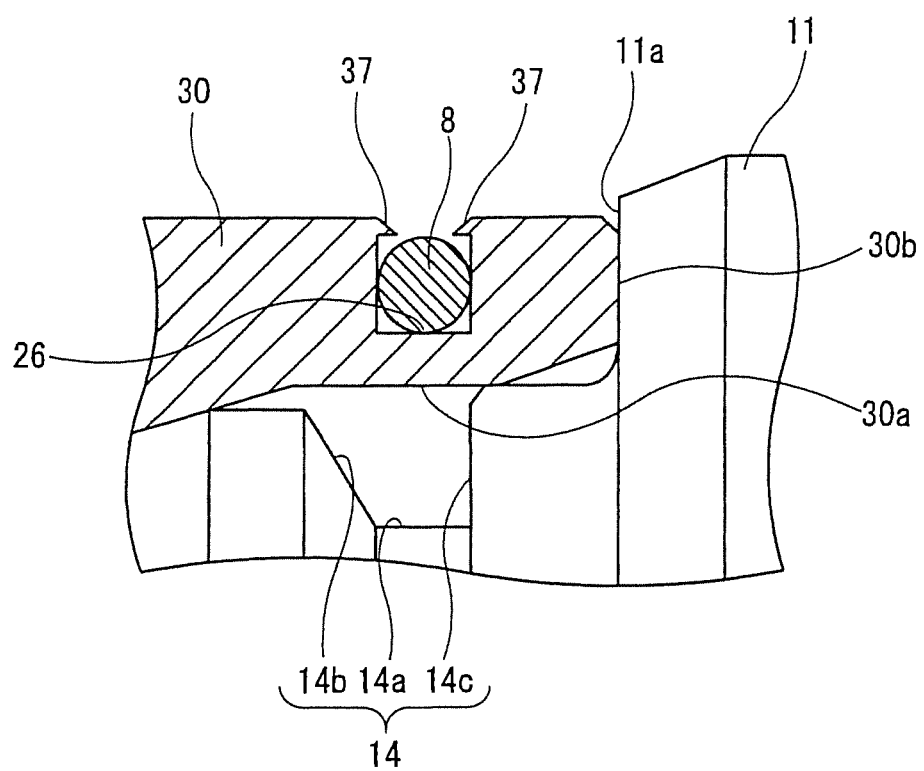
FIG. 9 is an expanded view of a C section shown in FIG. 7.

FIG. 4 shows a perspective view of a proximity of cylindrical section 30 of second constant velocity (universal) joint J2, FIG. 5 shows a partially cross sectional view in a proximity of cylindrical section 30 of second constant velocity (universal) joint J2, and FIG. 6 shows a cross sectional view cut away along a line A-A in FIG. 5, respectively. In addition, FIG. 7 shows a longitudinal cross sectional view in a state in which the output shaft is inserted into the cylindrical section of the second constant velocity (universal) joint, and FIG. 8 shows a longitudinal cross sectional view cut away along a line B-B in FIG. 7 and FIG. 8 shows an expanded view of a C portion depicted in FIG. 7.

Second constant velocity (universal) joint J2 has a rear end section at which a substantially cylindrically shaped cylindrical section 30 which serves to link second constant velocity (universal) joint J2 to output shaft 3 and an insertion hole 30a penetrated in an inside axial direction of this cylindrical section 30. A female spline 28 with which male spline 17 of output shaft 3 is engaged from the axial direction is cutout formed along the axial direction at the inner peripheral side of insertion hole 30a.

Furthermore, an annular retaining groove 26 which serves to retain circlip (retaining ring) 8 is cutout formed along the peripheral direction in the proximity of a rear end edge of cylindrical section 30. At a portion of retaining groove 26 in the peripheral direction, a first through hole 31 and a second through hole 32, namely, a pair of through holes which serve to expose engagement groove 14 externally, opposing against engagement stop groove 14 of output shaft 3 in a state in which output shaft 3 is inserted into insertion hole 30a of cylindrical section 30 are formed to oppose against each other in the radial direction. In other words, a portion of cylindrical section other than first and second through holes 31, 32 from among the peripheral range in which first and second through holes 31, 32 are disposed is constituted as retaining groove 26.

More specifically, first and second through holes 31, 32 are disposed so as to be spaced apart from each other in the peripheral direction and opposed against each other at a position symmetrically to rotation axial line Z by deleting a region of a portion of retaining groove 26 in the peripheral direction linearly along a vertical direction of FIG. 6.

Furthermore, shapes and positions of first and second through holes 31, 32 are formed to be orthogonal to rotation center axial line Z and are formed to be line symmetrical to a phantom line L1 passing through rotation center axial line Z. The circlip (retaining ring) 8 is disposed to be line symmetrical to phantom line L1.

In addition, first and second through holes 31, 32 are formed line symmetrically to a second phantom line L2 passing through rotation center axial line Z and orthogonal to rotation center axial line Z, as typically shown in FIG. 6. Retaining groove 26 is disposed line symmetrically to second phantom line L2.

In addition, as described above, on both end edges of retaining groove 26 at which first and second through holes 31, 32 are linearly cutout formed along a vertical direction in FIG. 6, first planar sections 33, 33 and second planar sections 34, 34 which are a pair of planar sections parallel to phantom line L1 are formed.

It should, herein, be noted that first and second through holes 31, 32 are coincident with (completely overlapped on) engagement stop mechanism 14 of output shaft 3 at an axial directional position at which tip end surface 30b of cylindrical section 30 is just brought in contact with an end surface 11a of large diameter section 11 of output shaft 3 which serves as a butting section.

In other words, tip surface 30b of cylindrical section 30 is brought in contact with end surface 11a of large diameter section 11 of output shaft 3 when output shaft 3 is appropriately inserted into insertion hole 30a and circlip (retaining ring) 8 is engagement stopped into engagement stop groove 14. According to this contact, the confirmation such that output shaft 3 is appropriately linked to cylindrical section 30 can be made.

A water-proof boot 35 which serves to prevent an invasion of water or dust from first and second through holes 31, 32 is mounted on cylindrical section 30 in a form of extending on and over cylindrical section 30 and output shaft 3 so as to enclose first and second through holes 31, 32. This water-proof boot 35 has a middle section structured in a substantially bellows shape so that water-proof boot 35 is formed to enable expansion and contraction (telescopically) in the axial direction. This water-proof boot 35 is attached and fixed to cylindrical section 30 via a boot attachment section 36 disposed at a basic end side of cylindrical section 30 which is opposite to an insertion inlet of output shaft 3. One end side of water-proof boot 35 in the axial direction is located at the outer peripheral side of cylindrical section 30.

Circlip (retaining ring) 8 is formed of a metal 10 having a substantially circular shape in cross section and having a slightly smaller linear diameter than a groove depth (a radial width) of retaining groove 26 and bent in substantially letter C shape. Circlip (retaining ring) 8 includes: a first insertion section 41 and a second insertion section 42 which are straight line sections formed linearly and parallel to first and second planar sections 33, 34 and inserted into first and second through holes 31, 32; a connection section 43 formed in an arc shape along the outer peripheral surface of retaining groove 26 (upper side retaining groove 26a) so as to envelop the outer peripheral surface of upper side retaining groove 26a located at an upper side of FIG. 8 and which connects peripheral direction one end sections (upper end sections in FIG. 8) of first and second insertion sections 41, 42; and a first engagement section 44 and a second engagement section 45; and a first engagement s section 44 and a second engagement section 45 formed in arc shapes along the outer peripheral surface of a lower side retaining groove 26b of retaining groove 26 so as to enclose the outer peripheral surface of lower side retaining groove 26b (in FIG. 8) of retaining groove 26.

Then, a caulked sections 37 on which a caulking is carried out for a portion of opening edges of retaining groove 26 in a state in which circlip (retaining ring) 8 is fitted into retaining groove 26 is formed so that a drop out of circlip (retaining ring) 8 fitted into retaining groove 26 is suppressed.

It should be noted that, in this embodiment, caulked section 37 which is formed on the opening edge of retaining groove 26 is exemplified. However the caulked section 37 is not always disposed on retaining groove 26. Although a specific drawing indication is omitted, caulked section 37 may be disposed on a portion of the peripheral direction of circlip (retaining ring) 8 which is a party side of retaining groove 26 so that the drop out of circlip (retaining ring) 8 from retaining groove 26 can be suppressed.

First and second insertion sections 41, 42 are brought in contact with respective first and second planar sections 33, 34 of upper side retaining groove 26a and lower side retaining groove 26b and inserted into first and second through holes 31, 32 in a form of extending on and over both planar sections 33, 34. Portions X1, X1 of first and second insertion sections 41, 42 denoted by shading in FIG. 8 are engageably stopped to side walls (rising surfaces 14b, 14c) of engagement stop groove 14 of cylindrical section 30 by exposing first and second insertion sections 41, 42 to the inner peripheral side of cylindrical section 30 via these respective through holes 31, 32.

First and second engagement sections 44, 45 are housed and retained within retaining groove 26 so as not to be protruded (not projected) from outer peripheral surface 30c of cylindrical section 30 while a slight gap C1 against lower side retaining groove 26b is provided, in a state in which circlip (retaining ring) 8 is appropriately mounted.

FIGS. 10(a) and 10(b) show corresponding drawings of FIG. 8 representing an engagement stop state and an engagement stop release state by means of a jig 40, respectively.

Jig engagement surfaces 44a, 45a which serve as jig engagement sections to engage a substantially pliers shaped jig 40 which serves to perform an engagement stop and a release of the engagement stop of circlip 8 (retaining ring) fitted into retaining groove 26 (refer to FIG. 8) are formed on tips of first and second engagement sections 44, 45 (refer to FIG. 8). This jig engagement surfaces 44a, 45a are surfaces substantially orthogonal to an extension direction of first and second engagement sections 44, 45 and are structured in a letter of a Japanese character of ノ ＼ as viewed from a front side of FIGS. 10(a) and 10(b) in a fitted state of these first and second engagement sections 44, 45 to retaining groove 26.

As viewed from such a structure as described above, in order to release the linkage between cylindrical section 30 and output shaft 3, as shown in FIG. 10(a), tip sections 40a, 40b of bifurcated jig 40 are brought in contact with jig engagement surfaces 44a, 45a, tip sections 40a, 40b are opened toward the outside so that first and second engagement sections 44, 45 are widened toward the outside and, thus, the engagement states of first and second insertion sections 41, 42 are released. Consequently, output shaft 3 can be pulled out from cylindrical section 30.

Figure 11A:
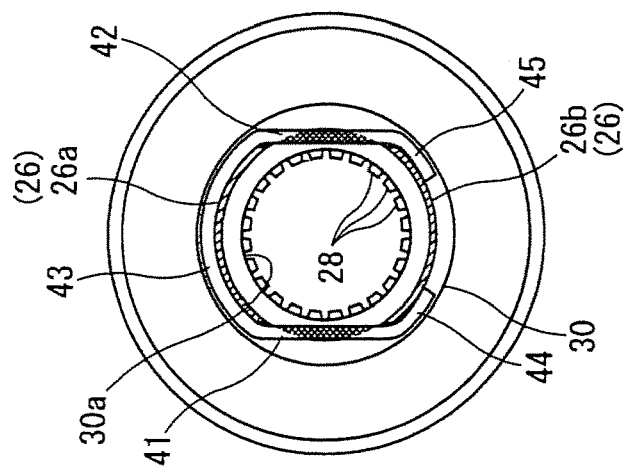
FIGS. 11(a) and 11(b) are a side view and a cross sectional view cut away along a line D-D in FIG. 11(a), each representing a state before the propeller shaft is linked to the output shaft.
Figure 11B:
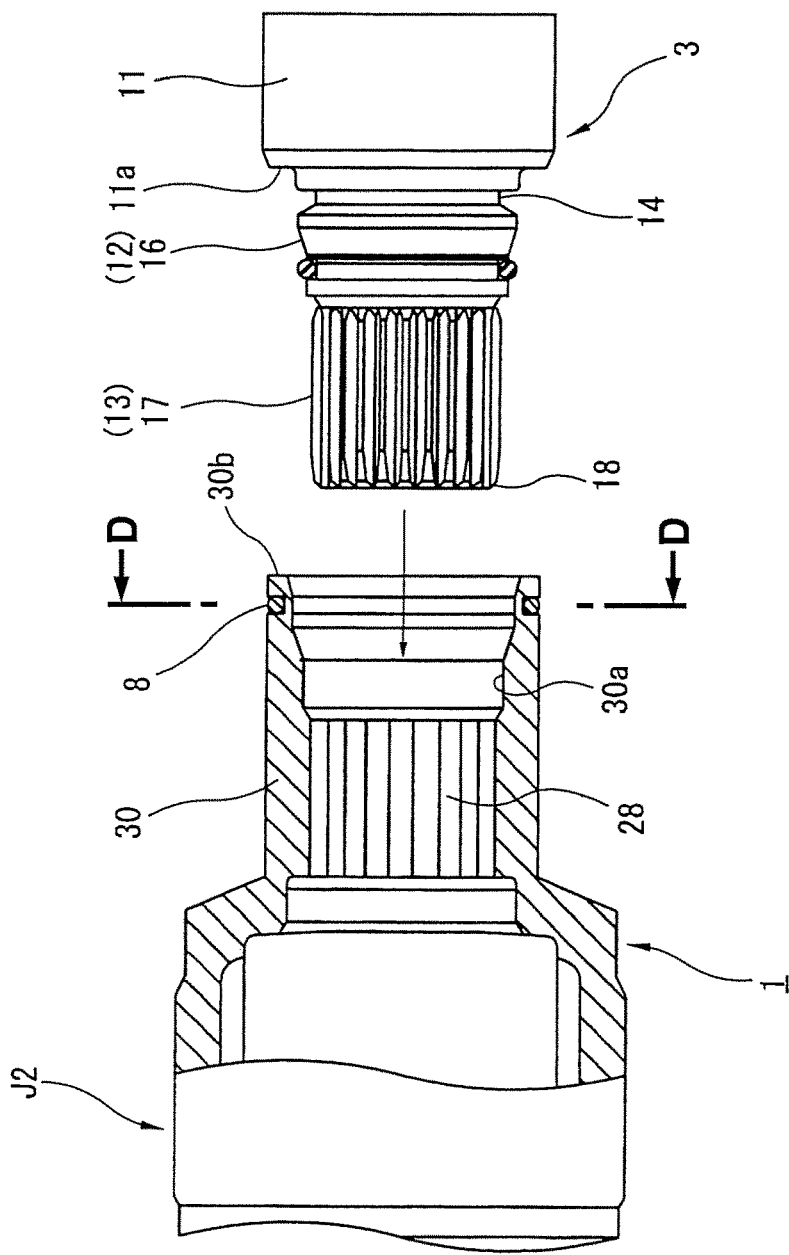
Figure 13A:
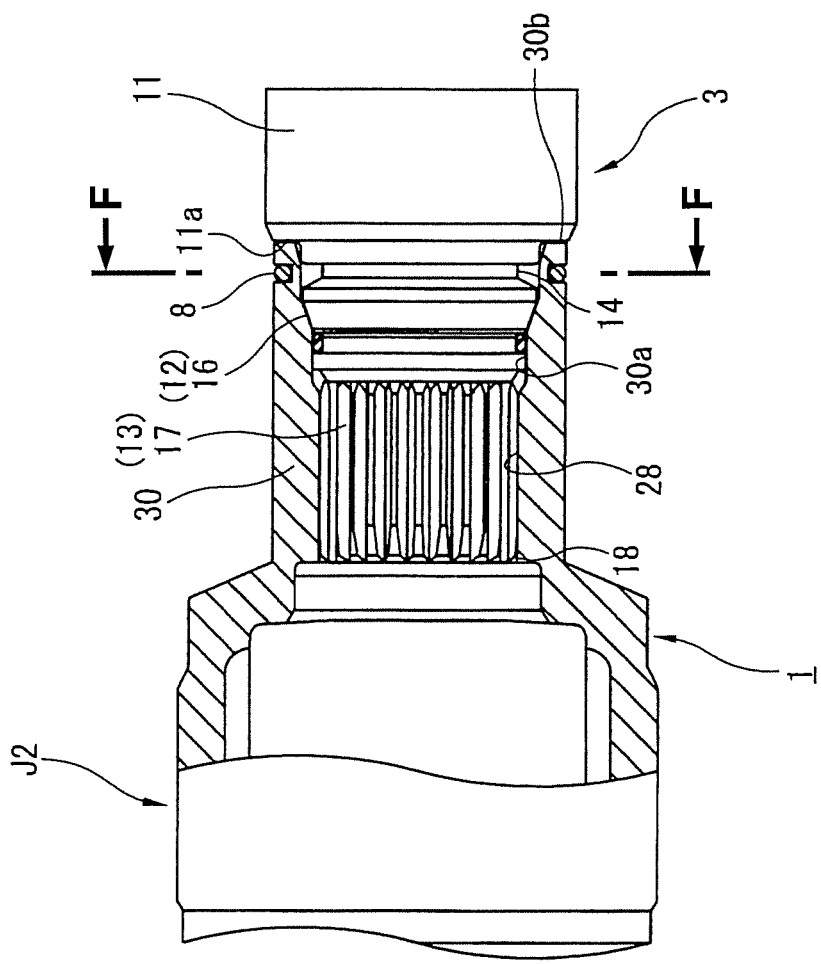
FIGS. 13(a) and 13(b) are a side view and a cross sectional view cut away along a line F-F in FIG. 13(a), each representing a state in which a linkage between the propeller shaft and the output shaft is completed.
Figure 13B:
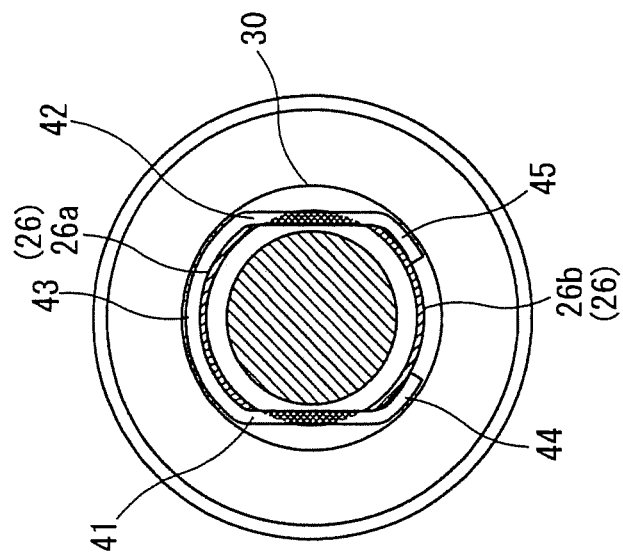

(A linkage method between propeller shaft (power transmission shaft) and the output shaft) Hereinafter, a linkage method between the propeller shaft (power transmission shaft) and the output shaft will be described below on a basis of FIGS. 11(a) through 13(b). It should be noted that FIGS. 11(a) and 11(b) show a state before the linkage, FIGS. 12(a) and 12(b) show a state in which the linkage is being carried out, and FIGS. 13(a) and 13(b) show a state in which the linkage is completed, respectively. FIGS. 11(a), 12(a), and 13(a) show views viewed from side directions of the propeller shaft (power transmission shaft) and the output shaft. FIGS. 11(b), 12(b), and 13(b) show cross sectional views cut away along line D-D of the corresponding FIGS. 11(a), 12(a), and 13(a), respectively.

First, as shown in FIGS. 11(a) and 11(b), circlip (retaining ring) 8 is fitted into retaining groove 26 of cylindrical section 30 of second constant velocity (universal) joint J2 from an upward direction. Thereafter, output shaft 3 is inserted along the axial direction into insertion hole 30a of cylindrical section 30 into which circlip (retaining ring) 8 is fitted.

Then, this output shaft 3 is inserted into insertion hole 30a of cylindrical section 30 in a form of widening (elastically deforming in an expanding open direction) first and second insertion sections 41, 42 exposed to the inner peripheral side (within insertion hole 30a) of cylindrical section 30 through first and second through holes 31, 32. Then, when first and second insertion sections 41, 42 run over a maximum diameter section of tapered section 16 and tip surface 30b of cylindrical section 30 is brought in contact with end surface 11a of large diameter section 11 of output shaft 3, as shown in FIGS. 13(a) and 13(b), restored first and second insertion sections 41, 42 are engageably inserted into engagement stop groove 14 and the linkage between propeller shaft 1 and output shaft 3 is completed.

It should, herein, be noted that, as described before, in this embodiment, on a state in which circlip (retaining ring) 8 is engageably inserted into engagement stop groove 14 at a time point at which end surface 11a of large diameter section 11 of output shaft 3 is brought in contact with tip surface 30b of cylindrical section 30 and the insertion of output shaft 3 is incomplete, as shown in FIG. 12(*b*), first and second insertion sections 41, 42 run on tapered section 16 and are protruded (projected) toward the outside of retaining groove 26.

That is, it becomes possible to visually recognize the engagement stop state of circlip (retaining ring) 8 from the outside of propeller shaft (power transmission shaft) 1 depending upon whether tip surface 30*b* of cylindrical section 30 is brought in contact with end surface 11*a* of output shaft 3 and whether first and second engagement sections 44, 45 are protruded from the outside (outer peripheral surface 30*c* of cylindrical section 30) of engagement stop groove 14.

Actions an Effects of the First Embodiment

As described hereinabove, propeller shaft (power transmission shaft) 1 in the first embodiment, includes: the shaft section interposed (intervened) between input shaft 2 and output shaft 3 (which is the pair of vehicle side rotational shafts); cylindrical section 30 disposed so as to enable an integral (integration) rotation with the shaft section, the pair of vehicle side rotational shafts being inserted into the inner peripheral side of cylindrical section 30; through holes 31, 32 penetrated in a peripheral directional range of a portion of cylindrical section 30 and opposed against engagement groove 14 in the radial direction disposed on the outer peripheral side of vehicle side rotational shafts in a state in which the vehicle side rotational shafts are inserted into the inner peripheral side of cylindrical section 30; and circlip (retaining ring) 8 fitted into cylindrical section 30 from the outer peripheral side, a portion of the circlip (retaining ring) in the peripheral direction enclosing the outer peripheral side of cylindrical section 30 and another portion of the circlip (retaining ring) in the peripheral direction being exposed to the inner peripheral side of the circlip (retaining ring) via through holes 31, 32, the circlip (retaining ring) 8 being enageably insertable into engagement stop groove 14.

That is, by an insertion of the vehicle side rotational shafts into cylindrical section 30 in a state in which circlip (retaining ring) 8 is fitted into cylindrical section 30, a portion of circlip (retaining ring) 8 in the peripheral direction exposed to the inner peripheral side of cylindrical section 30 via through holes 31, 32 is enabled to be engageably inserted into engagement stop groove 14.

In this way, the drop out of the vehicle side rotational shafts in a form of fitting circlip (retaining ring) 8 externally into cylindrical section 30 (from an external) is prevented. Thus, it becomes possible to visually recognize the engagement stop state of vehicle side rotational shafts by means of circlip (retaining ring) 8 from an external. Therefore, a facilitation of an engagement stop operation according to circlip (retaining ring) 8 is achieved and a security of an appropriate drop-out prevention with circlip (retaining ring) 8 is achieved.

Furthermore, in this embodiment, it becomes possible to engageably stop circlip (retaining ring) 8 into engagement stop groove 14 by an insertion of vehicle side rotational shafts in a state in which circlip (retaining ring) 8 is previously fitted into cylindrical section 30. Thus, an engagement operation according to circlip (retaining ring) 8 can be facilitated and a linkage operability between propeller shaft (power transmission shaft) 1 and the vehicle side rotational shafts can be improved.

In addition, cylindrical section 30 includes retaining groove 26 retaining circlip (retaining ring) 8 at a portion of a peripheral directional range in which through holes 31, 32 are disposed other than through holes 31, 32. In this way, by a retaining of circlip (retaining ring) 8 into retaining groove 26, a positional shift of circlip (retaining ring) 8 in the axial direction accompanied with the insertion of vehicle side rotational shafts can be suppressed and a quantity of a protrusion of circlip (retaining ring) 8 from outer peripheral surface 30*c* of cylindrical section 30 can be suppressed.

In addition, retaining groove 26 is annularly formed. Since retaining groove 26 is annularly formed, an advantage such that an overlap allowance between retaining groove 26 and circlip (retaining ring) 8 can largely be secured. In addition, in a case where retaining groove 26 is formed through a machining, the machining can easily be carried out.

In addition, through holes 31, 32 are constituted by first and second through holes 31, 32 spaced apart from each other in the peripheral direction of cylindrical section 30. In this way, the through holes are constituted as the pair of through holes 31, 32. An engagement stop force of circlip (retaining ring) 8 can be increased as compared with those constituted as a single through hole. A favorable drop-out prevention of vehicle side rotational shafts can be achieved.

In addition, first and second through holes 31, 32 are arranged at symmetrical positions to rotational center axial line Z of cylindrical section 30. Thus, a balance of circlip (retaining ring) 8 at the time of an expansion diameter becomes favorable and an improvement of the linkage operability between propeller shaft (power transmission shaft) 1 and vehicle side rotational shafts can be achieved.

Furthermore, shapes and positions of first and second through holes 31, 32 are orthogonal to rotational center axial line Z of cylindrical section 30 and these holes 31, 32 are formed line symmetrically to phantom line L1 passing through rotational center axial line Z. In the structure described above, it becomes possible to engageably stop and fix propeller shaft (power transmission shaft) 1 in spite of the fact that the insertion direction of circlip (retaining ring) 8. Thus, a further improvement of the linkage operability between power transmission shaft (propeller shaft) 1 and vehicle side rotational shafts can be achieved.

In addition, first and second through holes 31, 32 are formed by a deletion of a portion of cylindrical section 30 and first and second planer surface sections 33, 34 which are the pair of planer sections are formed at both end sections of rotational center axial line Z in the peripheral direction from among the deleted cross sections. These first and second planar sections 33, 34 are disposed in parallel to phantom line L1. Thus, the overlap allowance of circlip (retaining ring) 8 can largely be secured.

In addition, circlip (retaining ring) 8 includes first and second insertion sections 41, 42 as a straight line section by forming linearly a portion of circlip (retaining ring) 8 which is brought in contact with first and second planar sections 33, 34. Thus, since first and second planar sections 33 34 and first and second insertion sections 41 42 which are straight line sections can be brought in contact with each other, there is such a merit that the lap allowance of circlip (retaining ring) 8 can largely be secured.

In addition, cylindrical section 30 is provided with retaining groove 26 retaining circlip (retaining ring) 8 at the portion of the peripheral directional range in which first and second through holes 31, 32 are disposed other than first and second through holes 31, 32, the phantom line passing through rotational center axial line Z and orthogonal to rotational center axial line Z is the second phantom line L2. At this time, first and second through holes 31, 32 are formed line symmetrically to second phantom line L2 and retaining groove 26 is formed line symmetrically to second phantom line L2. In this way, since first and second through holes 31, 32 and retaining groove 26 are formed vertically and horizontally symmetrically, an improvement of a degree of freedom in the insertion direction of circlip (retaining ring) 8 is achieved and the improvement of the linkage operability between propeller shaft (power transmission shaft) 1 and vehicle side rotational shafts is achieved.

In addition, through holes 31, 32 are constituted by first through hole 31 and second through hole 32 spaced apart from each other in the peripheral direction of cylindrical section 30. Circlip (retaining ring) 8 includes: first insertion section 41 inserted into first through hole 31; second insertion section 42 inserted into second through hole 32; connection section 43 which connects the peripheral directional end section of first insertion section 41 and the peripheral directional end section of second insertion section 43; first engagement section 44 extended on the peripheral directional other end section 41; and a second engagement section 45 extended at the peripheral directional other end side of second insertion section 42. In this way, since first and second engagement sections 44, 45 which are engaged with retaining groove 26 are provided, the drop-out of circlip (retaining ring) 8 can be suppressed.

Moreover, first and second engagement sections 44, 45 are formed not to be protruded from outer peripheral surface 30a of cylindrical section 30. Thus, it becomes possible to detect an attachment failure of circlip (retaining ring) 8 depending on whether circlip (retaining ring) 8 protrudes from outer peripheral surface 30c of cylindrical section 30. Consequently, an improvement of a yield of a linkage failure of circlip (retaining ring) 8 between propeller shaft 1 and circlip (retaining ring) 8 can be achieved.

Furthermore, first and second engagement sections 44, 45 are provided with jig engagement surfaces 44a, 45a to which jig 40 which serves to remove circlip (retaining ring) 8 is engaged. In this way, since jig engagement surfaces 44a, 45a are provided, the improvement in operability of a removal operation of circlip (retaining ring) 8 can be achieved.

In addition, first and second engagement sections 44, 45 are formed to have a gap C1 against cylindrical section 30 in the radial direction of rotational center axial line Z. In this way, since gap C1 is provided between first and second engagement sections 44, 45 and cylindrical section 30, the attachment failure of circlip (retaining ring) 8 regardless of manufacturing errors of circlip (retaining ring) 8 and cylindrical section 30 can be suppressed.

In addition, engagement stop groove 14 includes small diameter side rising surface 14b and large diameter side rising surface 14c which are the pair of rising surfaces disposed on both sides of rotational center axial line Z in the axial direction. Small diameter side rising surface 14b which is the opposite side to the pull-out direction of vehicle side rotational shafts from among both rising surfaces 14b, 14c is formed in such a way that an angle θ1 of engagement stop groove 14 side from among angles formed between small diameter side rising surface 14b and rotational center axial line Z is larger than 90 degrees but smaller than 180 degrees. Thus, it becomes possible to form small diameter side rising surface 14b in an upward tilting shape directing toward first and second constant velocity (universal) joints J1, J2 and, consequently, small diameter side rising surface 14b which is the tilting wall reduces a pull-out load of vehicle side rotational shafts. Then, the improvement in a break-up operability of propeller shaft (power transmission shaft) 1 can be achieved.

Furthermore, large diameter side rising surface 14c in the pull-out direction of vehicle side rotational shafts of these both rising surfaces 14b, 14c is set in such a way that an angle θ2 formed between large diameter side rising surface 14c and rotational center axial line Z is substantially (at) a right angle. Thus, it becomes possible to suppress an inconvenience such that circlip (retaining ring) 8 easily run on (over) large diameter side rising surface 14c which is the standing-up wall. Consequently, the engagement force between engagement stop groove 14 and circlip (retaining ring) 8 in the insertion direction of vehicle side rotational shafts can sufficiently be exhibited.

In addition, vehicle side rotational shafts include tapered section 16 at the tip side of cylindrical section 30. Thus, the insertion of vehicle side rotational shafts into insertion hole 30a of cylindrical section 30 is guided along tapered section 16. Consequently, an insertion ability of vehicle side rotational shafts can be improved.

Moreover, vehicle side rotational shafts include the butting section (end surface 11a of large diameter section) against which the end section (tip surface 30b) of cylindrical section 30 in the state in which vehicle side rotational shafts are appropriately inserted. Thus, it becomes possible to confirm the insertion completion of vehicle side rotational shafts from the butting of vehicle side rotational shafts against tip surface 30b of cylindrical section 30. Consequently, the insertion confirmation can easily and accurately be made.

Figure 14:
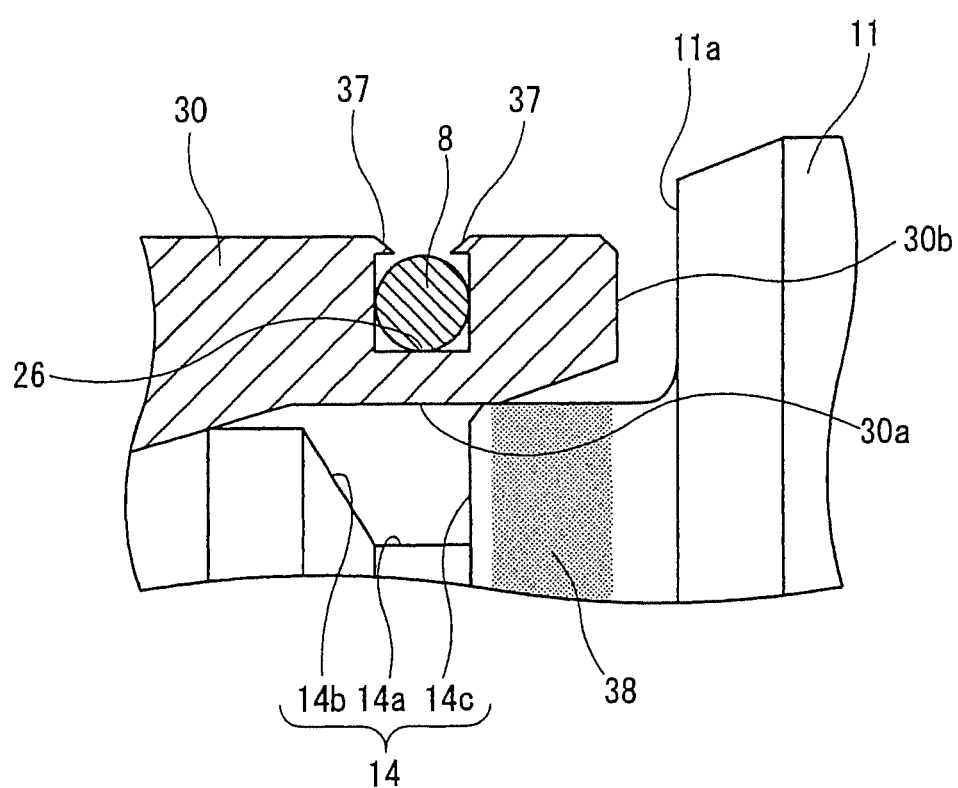
FIG. 14 is a view corresponding to FIG. 9 representing a modification of the first embodiment according to the present invention.

It should be noted that, in this embodiment, as confirmation means for confirming the insertion completion of vehicle side rotational shafts is not limited to the contact between cylindrical section 30 and end surface 11a of large diameter section 11. As shown in FIG. 14, for example, a colored section 38 which colors an opening edge section of engagement stop groove 14 of vehicle side rotational shafts at the large diameter side is continuously formed on the opening edge section in the peripheral direction. Then, when colored section 38 is enclosed and hidden by the tip section of cylindrical section 30, circlip (retaining ring) 8 is engageably inserted into engagement stop groove 14. The confirmation of the insertion completion of vehicle side rotational shafts may be carried out according to a presence or absence of the exposure of colored section 38.

In other words, vehicle side rotational shafts include colored section 38 enclosed and hidden by cylindrical section 30 in the state in which vehicle side rotational shafts are appropriately inserted into cylindrical section 30. In this way, according to enclosure and hide of colored section 38, the insertion completion of vehicle side rotational shafts may be confirmed. This method can also easily and accurately perform the insertion confirmation of vehicle side rotational shafts.

In addition, cylindrical section 30 includes boot attachment section 36 which serves to attach water-proof boot 35 at the opposite side to the insertion direction of vehicle side rotational shafts into through holes 31, 32 at the outer peripheral side of cylindrical section 30. Thus, first and second through holes 31, 32 are enclosed by water-proof boot 35 so that the invasion of water moisture or so forth from first and second through holes 31, 32 can be suppressed.

In addition, cylindrical section 30 or circlip (retaining ring) 8 includes caulked sections 37, 37 which caulk a portion of cylindrical section 30 or circlip (retaining ring) 8 in the peripheral direction in the state in which circlip (retaining ring) 8 is fitted into cylindrical section 30. In this way, the drop out of circlip (retaining ring) 8 can be suppressed according to the fastening structure by means of caulked sections 37, 37.

Second Embodiment

Figure 15:
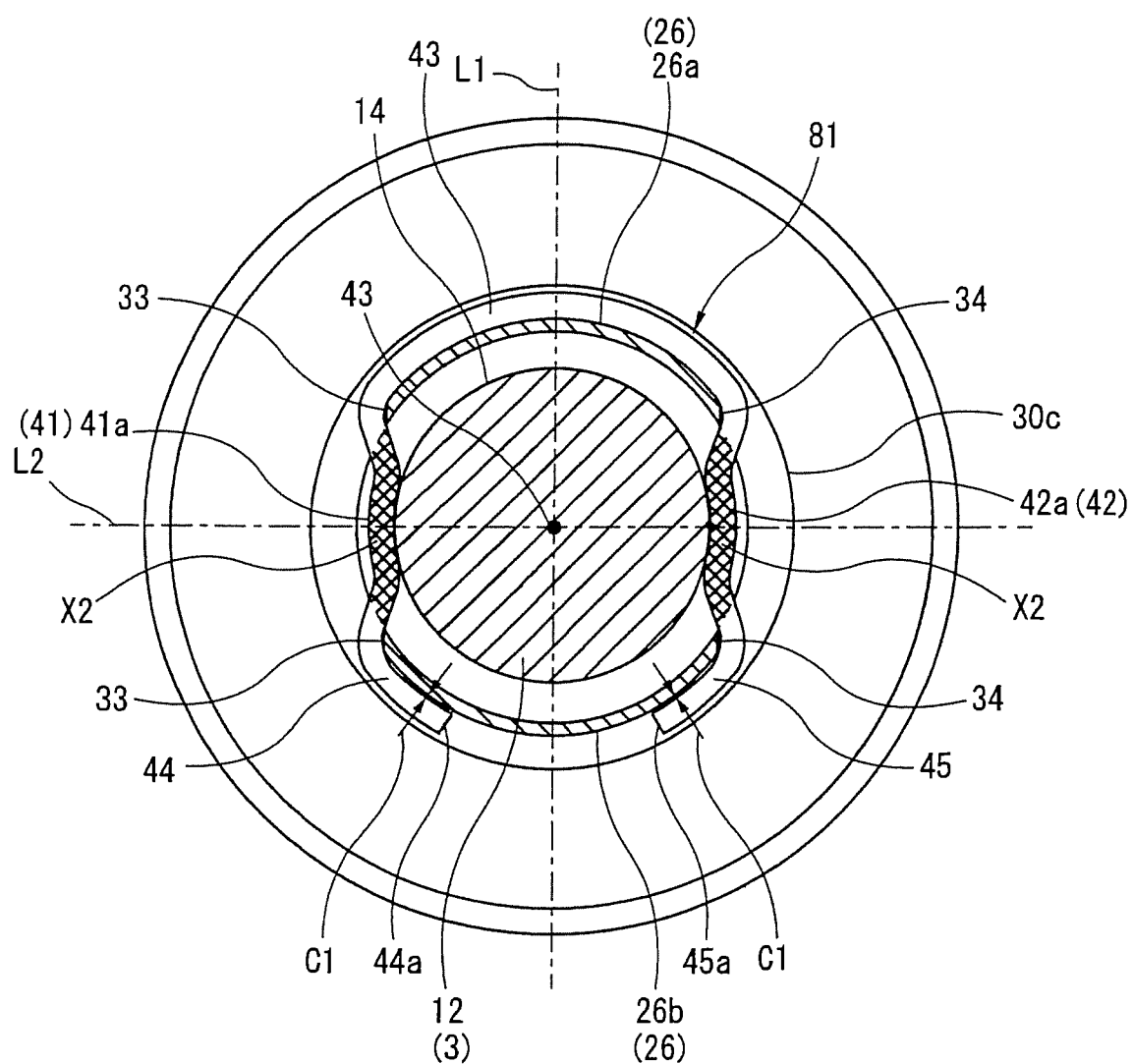
FIG. 15 is a view corresponding to FIG. 8 representing an engagement stop state by means of the circlip (retaining ring) in a second preferred embodiment according to the present invention.

FIG. 15 shows a second preferred embodiment of the propeller shaft (power transmission shaft) according to the present invention. In the second embodiment, the shape of circlip (retaining ring) 8 in the case of the first embodiment is modified. It should be noted that the basic structure of the second embodiment is the same as the first embodiment except the modification of circlip (retaining ring) 8. Hence, for the same structure as the first embodiment, the same reference numerals are provided and their explanations will be omitted (the same as those described below).

That is to say, circlip (retaining ring) 81 in this embodiment is structured in such a way that first and second projection sections 41a, 42a are formed as projection sections in which portions of respective insertion sections 41, 42 are projected in the outsides of the radial directions on first and second insertion sections 41, 42 which are formed linearly in the first embodiment.

In other words, circlip (retaining ring) 81 in this embodiment includes first and second projection sections 41a, 42a as projection sections in which portions of respective insertion sections 41, 42 are projected radially in the outward direction of rotational center axial line Z.

As described above, in the second embodiment, circlip (retaining ring) 81 is structured in such a way that portions of first and second insertion sections 41, 42 projected toward the outside of radial direction along side walls (rising surfaces 14b, 14c) of engagement stop groove 14 so that the overlap allowance (areas of portions X2, X2 denoted by net (shading) in FIG. 15) can further be increased.

Third Embodiment

Figure 16:
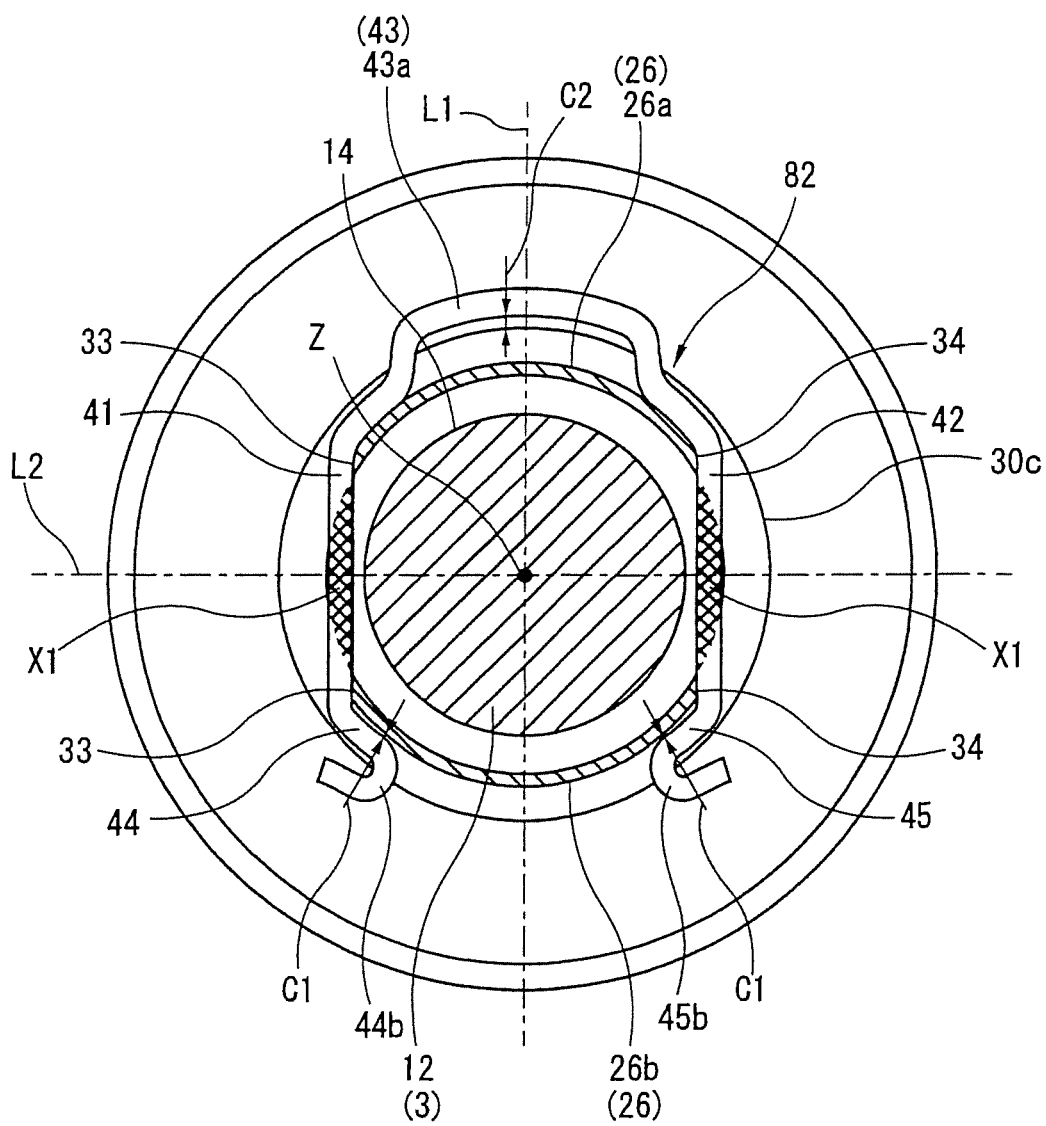
FIG. 16 is a view corresponding to FIG. 8 representing the engagement stop state by means of the circlip (retaining ring) in a third preferred embodiment according to the present invention.

FIG. 16 shows a third preferred embodiment of the propeller shaft (power transmission shaft) according to the present invention.

In this embodiment, the shape of circlip (retaining ring) 8 described in the first embodiment is modified.

Circlip (retaining ring) 82 in this embodiment includes a projection section 43a formed in such a way that a portion of connection section 43 is offset toward a more radially outer side of cylindrical section 30 than an outer peripheral surface 30c of cylindrical section 30. In addition, a predetermined gap C2 is formed radially between projection section 43a and cylindrical section 30 in an appropriate mounting state of circlip (retaining ring) 82.

In addition, in circlip (retaining ring) 82 in this embodiment, first and second engagement sections 44, 45 are bent in folded shapes toward the outside (radially outside). At the same time, portions of bending sections which are brought in contact with cylindrical section 30 (retaining groove) 26 during the external fitting of circlip (retaining ring) 82 into retaining groove 26 from the external are formed in arc shapes as first and second arc sections 44b, 45b. Specifically, basic end sides of first and second engagement sections 44, 45 are bent toward the inside along the inner peripheral surface of retaining groove 26 and tip end sides thereof are bent toward the outside via bending sections (first and second arc shaped sections 44b, 45b) in the fold shapes.

As described above, in this embodiment, first and second engagement sections 44, 45 have portions which are brought in contact with cylindrical section 30 (first and second arc shaped sections 44b, 45b) are bent in the arc shapes during the external fitting of circlip (retaining ring) 82 into retaining groove 26 from the external. Thus, during the external fitting of circlip (retaining ring) 82 into retaining groove 26 from the external, it becomes possible to suppress such an inconvenience that first and second engagement sections 44, 45 are caught in hole edges of first and second through holes 31, 32 and am attachment workability (operability) of circlip (retaining ring) 82 can be improved.

In addition, in this embodiment, connection section 43 includes projection section 43a formed in such a way that the portion of connection section 43 is offset toward the radial outside of cylindrical section 30 and is projected toward more outer side than outer peripheral surface 30c of cylindrical section 30.

Thus, in a case where circlip (retaining ring) 82 is removed, a predetermined tool having a tip side formed to be relatively flat such as a slotted screwdriver (not shown) is inserted within gap C2 and connection section 43 (projection section 43a) is lifted up toward an upper side of FIG. 16 via the tool. Consequently, a removal operation of circlip (retaining ring) 82 can become easier.

Fourth Embodiment

Figure 17:
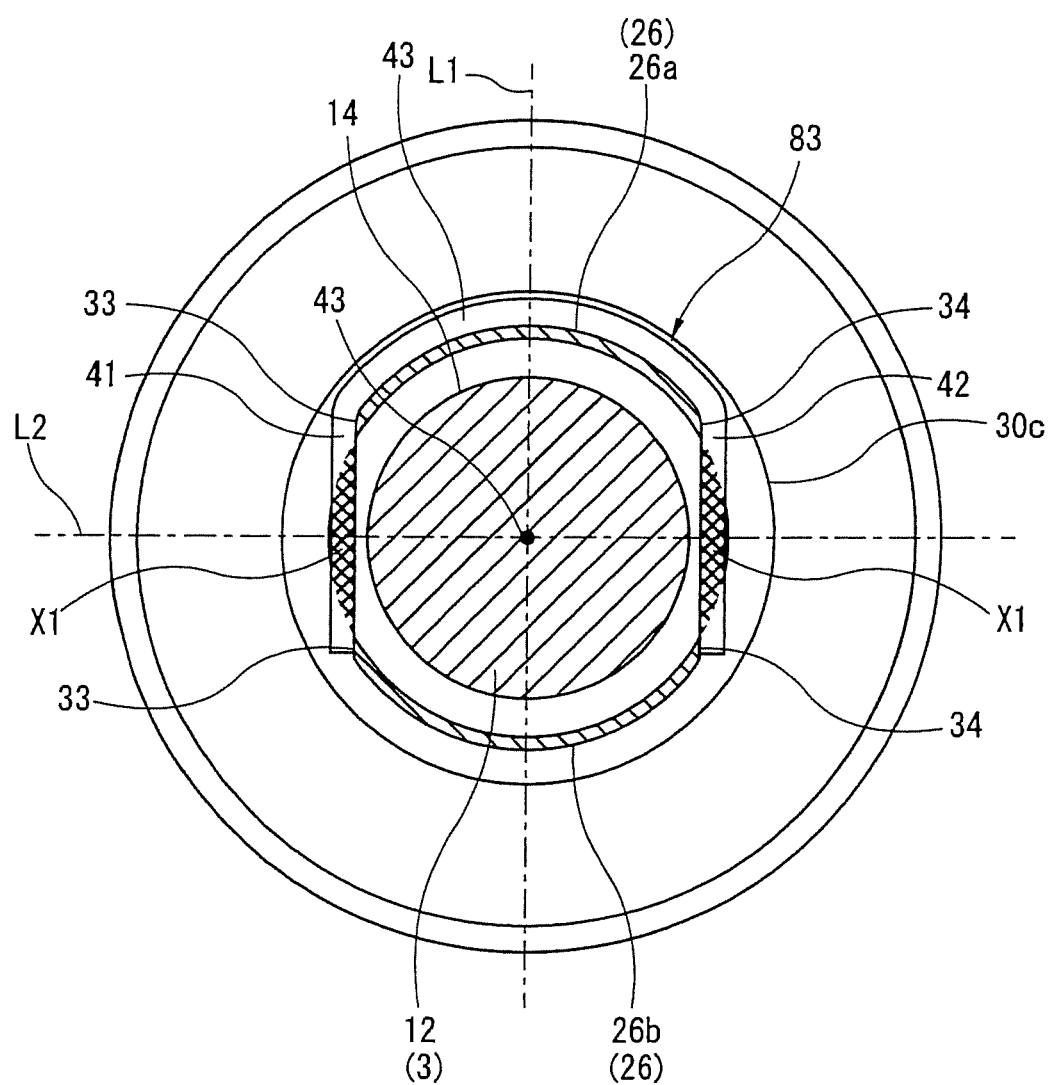
FIG. 17 is a view corresponding to FIG. 8 representing the engagement stop state by means of the circlip (retaining ring) in a fourth preferred embodiment according to the present invention.

FIG. 17 shows a fourth preferred embodiment of the propeller shaft (the power transmission shaft) according to the present invention. In this embodiment, the shape of circlip (retaining ring) 8 described in the first embodiment is modified.

That is, circlip (retaining ring) 83 in this embodiment has no first and second engagement sections 44, 45 (eliminated) from circlip (retaining ring) 8 in the first embodiment. Circlip (retaining ring) 83 includes: first insertion section 41 inserted into first through hole 31; second insertion section 42 inserted into second through hole 32; and connection section 43 which connects a peripheral directional one end section of first insertion section 41 and the peripheral directional one end section of second insertion section 42.

In this way, first and second engagement sections 44, 45 for drop-out prevention purposes are not installed in circlip (retaining ring) 83. Thus, during the external fitting of circlip (retaining ring) 83 onto retaining groove 26 from the external, there is no possibility that first and second engagement sections 44, 45 are caught in the hole edges or so forth of first and second through holes 31, 32 and the attachment workability of circlip (retaining ring) 83 can be improved.

Fifth Embodiment

Figure 18:
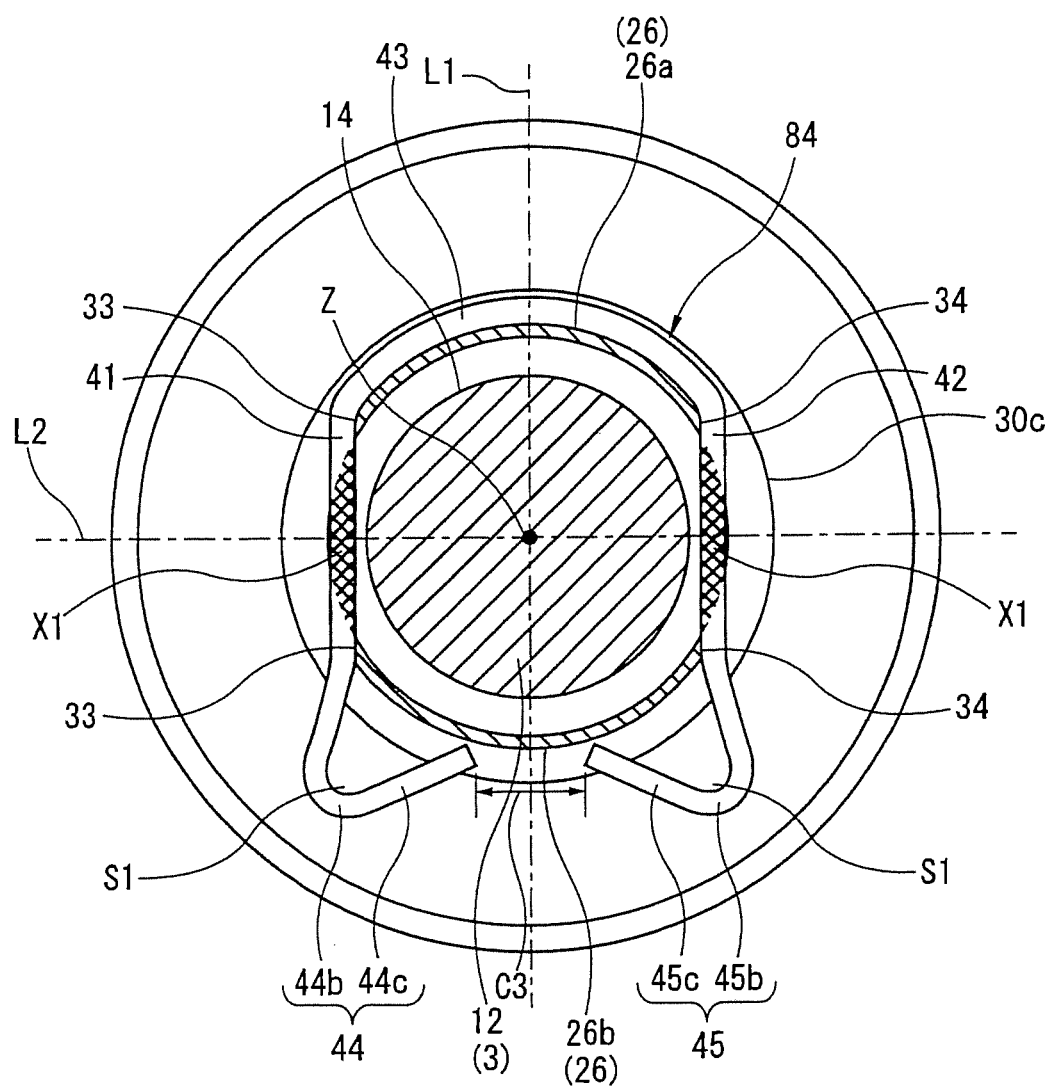
FIG. 18 is a view corresponding to FIG. 8 and representing the engagement stop state by means of the circlip (retaining ring) in a fifth preferred embodiment according to the present invention.

FIG. 18 shows a fifth preferred embodiment of the propeller shaft (power transmission shaft) according to the present invention. In this embodiment, the shape of circlip (retaining ring) 8 described in the first embodiment is modified.

That is, in circlip (retaining ring) 84 in this embodiment, forms of first and second engagement sections 44, 45 of the first embodiment are modified. First and second engagement sections 44, 45 are bent in the folded shapes toward the inside (inner side in the radial direction) and the bending sections are formed as arc shaped first and second arc shaped sections 44b, 45b.

In addition, more basic end sides of first and second engagement sections 44, 45 than first and second arc shaped sections 44b, 45b are formed to spread progressively toward the outside in a form of a Japanese letter of ハ as viewed from the front side and to be bent toward the inner side in the folded shapes so that more tip sides of first and second engagement sections 44, 45 than first and second arc shaped sections 44b, 45b indicates the Japanese letter of /\ as viewed from the front side. As a whole, first and second engagement sections 44, 45 are structured to be substantially in a letter V shape.

Predetermined spaces S1, S1 are formed between the inner sides of first and second arc shaped sections 44b, 45b and cylindrical section 30. That is, by stretching predetermined spaces S1, S1 toward the outside with pliers type of jig (not shown) fitted (engaged) into predetermined spaces S1, S1, engagement states of first and second insertion sections 41, 42 are released so that output shaft 3 can be pulled out from cylindrical section 30.

In addition, since more tip sides of first and second engagement sections 44, 45 than first and second arc shaped sections 44b, 45b are formed in the Japanese letter of /\ as viewed from the front side of FIG. 18, first and second inclination sections 44c, 45c in which portions of first and second engagement sections 30 (retaining groove 26) during the external fitting of circlip (retaining ring) 84 into retaining groove 26 from the external are downward inclination shapes toward the outside so as to constitute first and second inclination sections 44c, 45c. Then, an interval C3 (distance) of both inclination sections 44c, 45c is so constructed to be narrower than the interval between first and second engagement sections 44, 45 in the first embodiment.

As described above, since, in this embodiment, portions of first and second engagement sections 44, 45 which are brought in contact with cylindrical section 30 (retaining groove 26) are constituted by first and second inclination sections 44c, 45c downwardly inclined shapes toward the outside during the external fitting of circlip (retaining groove) 84 into retaining groove 26 from the external. From the relationship of first and second engagement sections 44, 45 to upper side retaining groove 26a which is downwardly inclined shape oriented toward the outside, first and second engagement sections 44, 45 become easily spread along the downward inclination so that the attachment workability of circlip (retaining ring) 84 can be improved.

In addition, since interval C3 between first and second inclination sections 44c, 45c is formed relatively narrowly, when output shaft 3 is inserted into cylindrical section 30 in a state in which circlip (retaining groove 26) is fitted into retaining groove 26 as described above, an effective suppression of such an inconvenience as the drop out of circlip (retaining ring) 84 from retaining groove 26 can be achieved.

Sixth Embodiment

Figure 19:
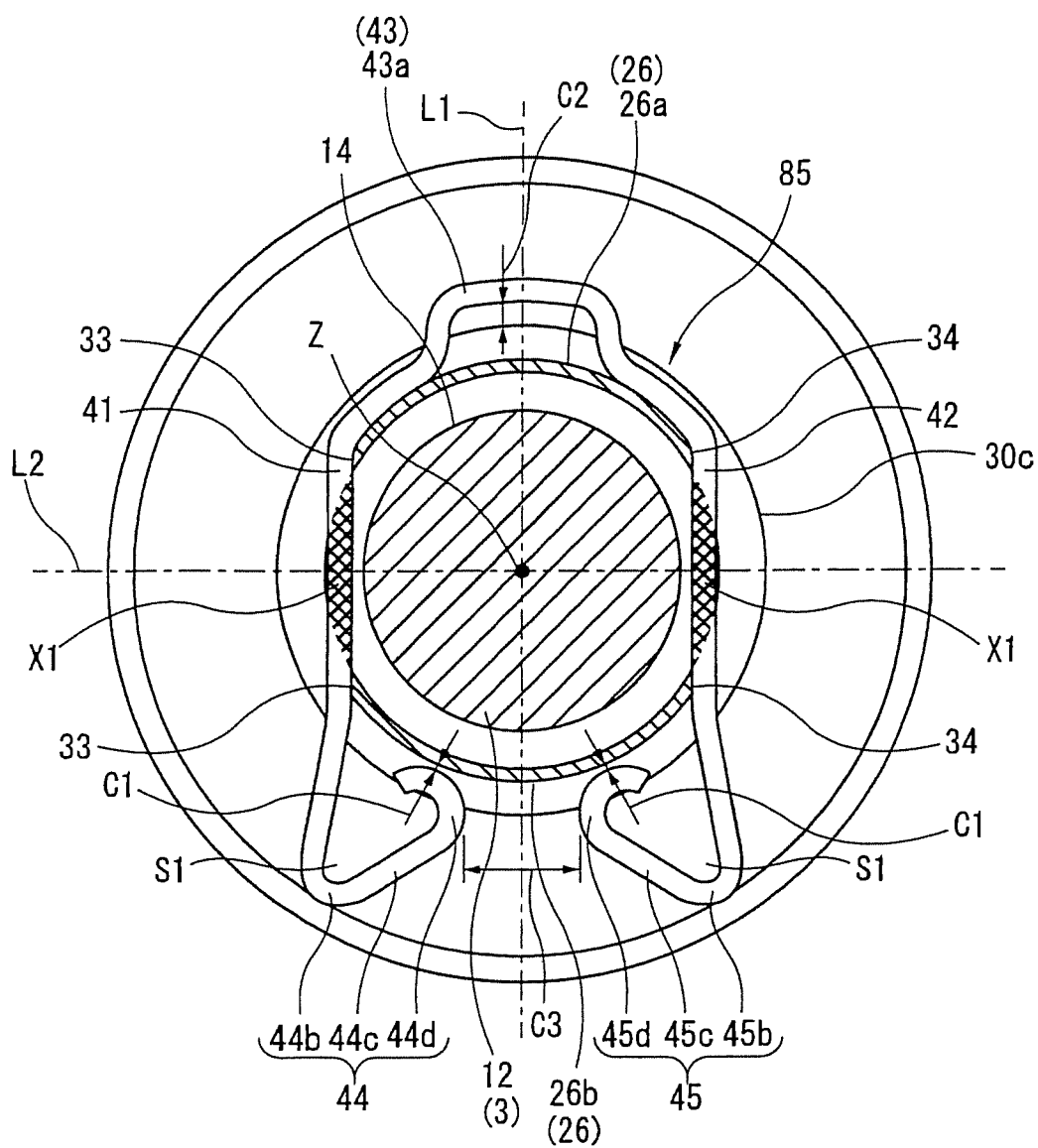
FIG. 19 is a view corresponding to FIG. 8 and representing the engagement stop state by means of the circlip (retaining ring) in a sixth preferred embodiment according to the present invention.

FIG. 19 shows a sixth preferred embodiment of the propeller shaft (the power transmission shaft) according to the present invention. In this embodiment, the shape of circlip (retaining ring) 83 described in the third embodiment is modified.

That is, circlip (retaining ring) 85 in this embodiment is formed in such a way that first and second engagement sections 44, 45 of circlip (retaining ring) 85 in this embodiment is formed in such a way that first and second engagement sections 44, 45 of circlip (retaining ring) 82 in this embodiment are bent in a letter of V shape toward the inside in the same way as first and second engagement sections 44, 45 of circlip (retaining ring) 84 related to the fifth embodiment. In addition, tip sections of first and second inclination sections 44c, 45c opposed against lower side retaining groove 26b are formed as third and fourth arc shaped sections 44d, 45d which are bent toward the inside thereof in the arc shape.

Thus, in this embodiment, since third and fourth arc shaped sections 44d, 45d are installed in addition to the action and effect achieved in the third and fifth embodiments, when circlip (retaining ring) 85 is removed via projection section 43a, first and second engagement sections 44, 45 easily spread along the upward inclination from the relationship of third and fourth arc shaped sections 44d, 45d to lower side retaining groove 26b. Consequently, a removal operability of circlip (retaining ring) 85 can be improved.

The present invention is not limited to the structures and forms exemplified in the respective embodiments. In a case of forms which can achieve the actions and effects according to the present invention, free modifications can be made according to specifications of application items, cost, or so forth.

Especially, in the embodiments described above, output shaft 3 is inserted into insertion hole 30a of cylindrical section 30 in the state in which the circlip (retaining ring) (8, 81, 82, 83, 84, and 85) is previously fitted into retaining groove 26 of cylindrical section 30 of second constant velocity (universal) joint J2. However, the linkage of both of the output shaft and the cylindrical section is not limited to this form.

In other words, after output shaft 3 is inserted into insertion hole 30a of cylindrical section 30 without previous external fitting of circlip (retaining ring) 8, 81, 82, 83, 84, or 85 into retaining groove 26 from the external, circlip (retaining ring) 8, 81, 82, 83, 84, or 85 may engageably be stopped into engagement stop groove 14 of output shaft 3 with circlip (retaining ring) 8, 81, 82, 83, 84, or 85 externally fitted into retaining groove 26 from the external.

In addition, in the respective embodiments, as the linkage structure of propeller shaft (power transmission shaft) 1, the linkage between second constant velocity (universal) joint J2 and output shaft 3 is exemplified. As described before, the present invention is applicable to the same as the linkage of first constant velocity (universal) joint J1 and input shaft 2.

Furthermore, the respective embodiments exemplify the present invention applicable to the constant velocity (universal) joint of the propeller shaft (the power transmission shaft). However, the present invention may be applied to another joint, for example, a rubber coupling, a Cardan joint, or so forth in addition to the constant velocity (universal) joint.

As the propeller shaft (power transmission shaft) based on the above-described embodiments, the following forms may be considered.

That is, the propeller shaft (power transmission shaft) includes, as a first form, a shaft section intervened between a first shaft of a driving source side and a second shaft of a driving wheel side which are a pair of vehicle side rotational shafts; a cylindrical section disposed integrally rotatable with the shaft section and into an inner peripheral side of which the vehicle side rotational shafts are inserted; a through hole penetrated in a peripheral direction range of a portion of the cylindrical section and opposed against an engagement stop groove in a radial direction, the engagement stop groove being disposed on the outer peripheral side of the vehicle side rotational shafts in a state in which the vehicle side rotational shafts are inserted into inner peripheral side of the cylindrical section; and a circlip (retaining ring) fitted into the cylindrical section from the outer peripheral side thereof, a portion of the circlip in a peripheral direction enclosing the outer peripheral side of the cylindrical section, and another portion of the circlip in the peripheral direction being exposed to the inner peripheral side of the cylindrical section via the through hole to be engageably inserted (stopped) into the engagement stop groove.

In a preferred embodiment of the propeller shaft (power transmission shaft), the cylindrical section includes a retaining groove retaining the circlip (retaining ring) at a portion of the cylindrical section in the peripheral direction range in which the through holes are disposed other than the through holes.

Furthermore, in another preferred embodiment, the retaining groove is formed annually, in any of forms of the propeller shaft (power transmission shaft).

In another preferred embodiment, in any of forms of the propeller shaft (power transmission shaft), the through holes are constituted by first and second through holes spaced apart from each other in the peripheral direction of the cylindrical section.

In another preferred embodiment, the first and second through holes are arranged at positions symmetrically to the rotational center axial line of the cylindrical section.

In another preferred embodiment, the shapes and positions of the first and second through holes are orthogonal to the rotation center axial line of the cylindrical section and are formed to be line symmetrical to a phantom line passing through the rotational center axial line, and the circlip (retaining ring) is disposed line symmetrically to the phantom line.

In a still another preferred embodiment, in any of the forms of the propeller shaft (power transmission shaft) the first and second through holes are formed by a deletion of a portion of the cylindrical section, a pair of plane sections are formed at both end section of the deleted cross section in the peripheral direction of the rotation center axial line, and the pair of plane sections are disposed in parallel to the phantom line.

In a further preferred embodiment, in any of the forms of the propeller shaft (power transmission shaft), the circlip (retaining ring) includes a straight line section which is formed in a straight line shape from a portion of the circlip (retaining ring) which is brought in contact with the pair of planar sections.

In a further another preferred embodiment, in any of the forms of the propeller shaft (power transmission shaft), the circlip (retaining ring) includes the projection sections which project a portion of the circlip (retaining ring) passing through the rotational center axial line and intersecting a second phantom line orthogonal to the rotational center axial line toward a radial directional outside of the rotational center axial line.

In a further another preferred embodiment, in any of the forms of the propeller shaft (the power transmission shaft), the cylindrical section includes the retaining groove which retains the circlip (retaining ring) at a portion of the peripheral direction range in which the through holes are disposed other than the through holes. When a phantom line passing through the rotational center axial line and orthogonal to the rotational center axial line is a second phantom line, the first and second through holes are formed line symmetrically to the second phantom line and the retaining groove is formed line symmetrically to the second phantom line.

In a further another preferred embodiment, in any one of the forms of the propeller shaft (power transmission shaft), the through hole is constituted by the first and second through holes spaced from each other in the peripheral direction of the cylindrical section and the circlip (retaining ring) includes: a first insertion section inserted into the first through hole; a second insertion section inserted into the second through hole; a connection section which connects the peripheral directional one end section of the first insertion section and the peripheral directional one end section of the second insertion section; the first engagement section extended at the other end side of the first insertion section; and a second engagement section extended at the peripheral directional other end side of the second insertion section.

In a further another preferred embodiment, in any one of the forms of the propeller shaft (power transmission shaft), the first and second engagement sections are formed not to be protruded from the outer peripheral surface of the cylindrical section in an appropriately mounted state.

In a further another preferred embodiment, in any one of the forms of the propeller shaft (power transmission shaft), the first and second engagement sections include jig engagement sections which engage a jig which serves to remove the circlip (retaining ring).

In a further another preferred embodiment, in any one of the forms of the propeller shaft (power transmission shaft), the gap is provided between the first and second engagement sections and the cylindrical section in the radial direction of the rotation center axial line.

In a further another preferred embodiment, in any one of the forms of the propeller shaft (power transmission shaft), portions of the first and second engagement sections which are brought in contact with the cylindrical section during the fitting of the circlip (retaining ring) onto the retaining groove are bent in the arc shapes.

In a further another preferred embodiment, in any one of the forms of the propeller shaft (power transmission shaft), the engagement stop groove includes a bottom surface and the pair of rising surfaces disposed at the axial directional both sides of the bottom surface and, concerning one of the pair of rising surfaces which is the opposite side to the pull-out direction of the vehicle side rotational shafts, from among angles formed between the corresponding one of the pair of rising surfaces and the rotation center axial line, one of the angles at the engagement stop groove side is larger than 90 degrees but is smaller than 180 degrees.

In a further another preferred embodiment, in any one of the forms of the propeller shaft (power transmission shaft), concerning one of the pair of rising surfaces in the pull-out direction of the vehicle side rotational shafts, the angle formed between the corresponding one of the pair of rising surfaces and the rotation center axial line is set at substantially a right angle.

In a further another preferred embodiment, in any one of the forms of the propeller shaft (power transmission shaft), the vehicle side rotational shafts have a tapered section at tip end sides of the cylindrical section.

In a further another preferred embodiment, in any one of the forms of the propeller shaft (power transmission shaft), the vehicle side rotational shafts include a butting section against which the end section of the cylindrical section is butted in a state in which the vehicle side rotational shafts are appropriately inserted.

In a further another preferred embodiment, in any one of the forms of the propeller shaft (power transmission shaft), the vehicle side rotational shafts include the colored section hidden by the cylindrical section in a state in which the vehicle side rotational shafts are appropriately inserted into the cylindrical section.

In a further another preferred embodiment, in any one of the forms of the propeller shaft (power transmission shaft), the cylindrical section includes the boot attachment section which serves as the attachment of the water-proof boot at a portion of the outer peripheral side of the cylindrical section which is an opposite side to the insertion inlet of the vehicle side rotational shafts.

In a further another preferred embodiment, in any one of the forms of the propeller shaft (power transmission shaft), either the cylindrical section or the circlip (retaining ring) includes a caulking section which caulks a peripheral directional section of the cylindrical section or the circlip (retaining ring) in a state in which the circlip is fitted into the cylindrical section.

In a further another preferred embodiment, in any one of the forms of the propeller shaft (power transmission shaft), the though hole is constituted by the first through hole and the second through hole which are spaced apart from each other in the peripheral direction of the cylindrical section and the circlip includes the first insertion section inserted into the first through hole and the second insertion section inserted into the first through hole, and the connection section which connects the peripheral direction end section of the first insertion section and the peripheral direction end section of the second insertion section.

In a further another preferred embodiment, in any one of the forms of the propeller shaft (power transmission shaft), the connection section is formed in such a way that a portion of the connection section is offset toward the outside in the radial direction of the cylindrical section and is projected exceeding the outer peripheral surface of the cylindrical section.

In addition, as a linkage method of the propeller shaft (power transmission shaft) based on the above-described embodiments, the following form described below may be considered.

That is, a linkage method of the propeller shaft (power transmission shaft), the propeller shaft (power transmission shaft) includes: a shaft section a shaft section intervened between a first shaft of a driving source side and a second shaft of a driving wheel side which are a pair of vehicle side rotational shafts; a cylindrical section disposed integrally rotatable with the shaft section and into an inner peripheral side of which the vehicle side rotational shafts are inserted; a through hole penetrated in a peripheral direction range of a portion of the cylindrical section and opposed against an engagement stop groove in a radial direction, the engagement stop groove being disposed on an outer peripheral side of the vehicle side rotational shafts on a state in which the vehicle side rotational shafts are inserted into an inner peripheral side of the cylindrical section; and a circlip (retaining ring) fitted into the cylindrical section from the outer peripheral side thereof, a portion of the circlip in a peripheral direction enclosing the outer peripheral side of the cylindrical section, and another portion of the circlip in the peripheral direction being exposed to the inner peripheral side of the cylindrical section via the through hole to be engageably inserted into the engagement stop groove, the portion of the circlip (retaining ring) in the peripheral direction exposed to the inner peripheral side of the cylindrical section via the through hole is engageably inserted into the engagement stop groove by inserting the vehicle side rotational shafts into the cylindrical section in the state in which the circlip (retaining ring) is fitted onto the cylindrical section.

This application is based on a prior Japanese Patent Application No. 2016-129514 filed in Japan on Jun. 30, 2016. The entire contents of this Japanese Patent Application No. 2016-129514 are hereby incorporated by reference. Although the invention has been described above by reference to certain embodiments of the invention, the invention is not limited to the embodiment described above. Modifications and variations of the embodiments described above will occur to those skilled in the art in light of the above teachings.

The scope of the invention is defined with reference to the following claims.

What is claimed is:

1. A power transmission shaft interposed between a first shaft section and a second shaft section, the first shaft section and the second shaft section being a pair of vehicle side rotational shaft sections, the first shaft section being disposed on a driving source side of the vehicle and the second shaft section being disposed on a driving wheel side, the power transmission shaft transmitting a rotation of the driving source to the driving wheel and comprising:
   a shaft section disposed between the first shaft section and the second shaft section;
   a cylindrical section rotated integrally with the shaft section and formed cylindrically, each of the pair of vehicle side rotational shaft sections being inserted into an inside of the cylindrical section and into an inner peripheral side of which a male spline section disposed on an outer peripheral side of a tip section of the vehicle side rotational shaft is inserted;
   a through hole penetrated through part of the cylindrical section in a peripheral directional range, the through hole placed at a location of the vehicle side rotational shaft that is closer to a withdrawal side of the vehicle side rotational shaft than the male spline section in a state in which the male spline section is inserted into the inner peripheral side of the cylindrical section, and the through hole aligned with an engagement stop groove disposed in a radial direction, the engagement stop groove being disposed in the outer peripheral side of the vehicle side rotational shaft at a location at which the male spline section is not disposed; and
   a circlip disposed to be engaged on at least a portion of the outer peripheral side of the cylindrical section and to enclose at least a portion of the outer peripheral side of the cylindrical section including the engaged portion, a portion of the circlip being inserted into the through hole from the outer peripheral side of the cylindrical section and being engaged on the engagement stop groove, the engagement stop groove including: a bottom surface; and a pair of rising surfaces disposed on both sides of the bottom surface in the direction of the rotational center axial line, one of the pair of rising surfaces in a direction opposite to the withdrawal direction of the vehicle side rotational shaft having an angle at the engagement stop groove side from among angles formed by the rising surface and the rotational shaft axial center axial line being larger than 90° but smaller than 180° and the whole of the engagement stop groove from the bottom surface of the engagement stop groove to an opening edge of the engagement stop groove being formed in a gradient shape.

2. The power transmission shaft as claimed in claim 1, wherein the cylindrical section includes a retaining groove disposed on a portion of the outer peripheral side of the cylindrical section other than the portion of the cylindrical section at which the through hole is disposed, in the direction around the rotational axial line.

3. The power transmission shaft as claimed in claim 2, wherein the retaining groove is an annular groove.

4. The power transmission shaft as claimed in claim 1, wherein the through hole includes a first through hole and a second through hole, the first through hole and the second through hole being spaced apart from each other by a predetermined distance in the direction around the rotational axial line.

5. The power transmission shaft as claimed in claim 4, wherein the first through hole and the second through hole are disposed at symmetrical positions to the rotational axial line.

6. The power transmission shaft as claimed in claim 5, wherein shapes and positions of the first through hole and the second through hole are orthogonal to the rotational axial line, are disposed symmetrically to a phantom line passing through the rotational axial line, and the circlip is disposed line symmetrically to the phantom line.

7. The power transmission shaft as claimed in claim 6, wherein each of the first through hole and the second through hole is formed by an elimination of a portion of the cylindrical section, a pair of planer sections are formed at both end sections of an eliminated cross section of the cylindrical section in the direction around the rotational axial line.

8. The power transmission shaft as claimed in claim 7, wherein the circlip includes a straight line section, a position of the straight line section at which the circlip is brought in contact with the pair of planer sections are formed in a straight line.

9. The power transmission shaft as claimed in claim 5, wherein the cylindrical section includes a retaining groove disposed on an outer peripheral side of the cylindrical section and disposed at a portion of the cylindrical section other than portions of the cylindrical section at which a pair of through holes are disposed in the direction around the rotational axial line, when a phantom line passing through the rotational axial line and orthogonal to the rotational axial line is a second phantom line, the first through hole and the second through hole being formed line symmetrically to the phantom line and the second phantom line and the retaining groove being formed line symmetrically to the phantom line and the second phantom line.

10. The power transmission shaft as claimed in claim 1, wherein the through hole includes a first through hole and a second through hole, both of the first and second through holes being spaced apart from each other by a predetermined distance in a direction around the rotational axial line, the circlip includes: a first inserting section inserted into the first through hole; a second inserting section inserted into the second through hole; a connection section connecting one end side of the first inserting section to one end side of the second inserting section; a first engagement section disposed on the other end side of the first inserting section and extended in an opposite side of the first inserting section in the direction around the rotational axial line; and a second engagement section disposed on the other end side of the second inserting section and extended in an opposite side to the second inserting section.

11. The power transmission shaft as claimed in claim 10, wherein the first engagement section and the second engagement section are formed not to be protruded from the outer peripheral surface of the cylindrical section in a state in which the circlip is normally attached.

12. The power transmission shaft as claimed in claim 10, wherein the first engagement section and the second engagement section include a jig purpose engagement section to which a jig to remove the circlip is engaged.

13. The power transmission shaft as claimed in claim 10, wherein the first engagement section and the second engagement section include a gap against the cylindrical section in the radial direction of the rotational axial line.

14. The power transmission shaft as claimed in claim 1, wherein one of the pair of rising surfaces which is at the side of the direction in which a corresponding one of the vehicle side rotational shaft sections is pulled out is formed in such a way that an angle formed between a corresponding one of the pair of rising surfaces which is at the side of the direction in which a corresponding one of the vehicle side rotational shaft sections is pulled out and the corresponding one of the vehicle side rotational shaft sections is a substantially right angle.

15. The power transmission shaft as claimed in claim 1, wherein the vehicle side rotational shaft sections include a tapered section formed at a tip side of an insertion side of the cylindrical section in such a way that a diameter of one of the vehicle side rotational shaft sections becomes smaller as a corresponding one of the vehicle side rotational shaft sections goes toward a tip side.

16. The power transmission shaft as claimed in claim 1, wherein each of the vehicle side rotational shaft sections includes a butting section against which an end section of the cylindrical section is butted.

17. The power transmission shaft as claimed in claim 1, wherein the vehicle side rotational shaft sections include a colored section colored on the outer peripheral side of the vehicle side rotational shaft sections and which is enclosed by the cylindrical section in a state in which the vehicle side rotational shaft section is normally inserted into the cylindrical section.

18. The power transmission shaft as claimed in claim 1, wherein the cylindrical section includes a boot attachment section disposed at an opposite side to an insertion inlet into which the vehicle side rotational shaft sections are inserted with respect to the through hole at the outer peripheral side of the cylindrical section.

19. The power transmission shaft as claimed in claim 1, wherein either the circlip or the cylindrical section includes a caulking section formed by caulking in a state in which the circlip is attached to the cylindrical section.

20. The power transmission shaft as claimed in claim 19, wherein the through hole includes a first through hole and a second through hole disposed to be spaced apart from each other by a predetermined distance in a direction around the rotational axial line and the circlip includes a first insertion section inserted into the first through hole; a second insertion section inserted into the second through hole; and a connection section connecting one end side of the first insertion section and one end side of the second insertion section.

* * * * *